US009420432B2

(12) United States Patent
Matthews, III et al.

(10) Patent No.: US 9,420,432 B2
(45) Date of Patent: Aug. 16, 2016

(54) MOBILE DEVICES CONTROL

(71) Applicant: Microsoft Corporation, Redmond, WA (US)

(72) Inventors: Joseph H. Matthews, III, Woodinville, WA (US); Joseph A. Schrader, Kirkland, WA (US); Ted Tai-Yu Chen, Redmond, WA (US); Raman K. Sarin, Kirkland, WA (US); Joseph Spencer King, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/726,048

(22) Filed: Dec. 22, 2012

(65) Prior Publication Data

US 2013/0295913 A1    Nov. 7, 2013

Related U.S. Application Data

(60) Provisional application No. 61/580,131, filed on Dec. 23, 2011, provisional application No. 61/580,137, filed on Dec. 23, 2011.

(51) Int. Cl.
*H04M 3/00* (2006.01)
*H04M 1/66* (2006.01)
(Continued)

(52) U.S. Cl.
CPC .......... *H04W 4/046* (2013.01); *H04M 1/72577* (2013.01); *H04M 1/6075* (2013.01)

(58) Field of Classification Search
CPC ..... H04W 4/027; H04W 4/028; H04W 4/046; H04W 4/16; H04M 2242/30; H04M 2242/14
USPC ........................ 455/411, 456.4, 410, 418, 419
See application file for complete search history.

(56) References Cited

U.S. PATENT DOCUMENTS 5,883,598 A    3/1999  Parl et al.
6,286,001 B1   9/2001  Walker et al.
(Continued)

FOREIGN PATENT DOCUMENTS

CN    1984402    6/2007
CN    101112072  1/2008
(Continued)

OTHER PUBLICATIONS

"EP Search Report", EP Application No. 09747072.8, Jan. 17, 2003, 5 Pages.

(Continued)

*Primary Examiner* — Joshua Schwartz

(74) *Attorney, Agent, or Firm* — Judy Yee; Micky Minhas

(57) ABSTRACT

In embodiments of mobile devices control, a mobile device includes a communication interface for control communication with associated devices of the mobile device, and the associated devices correspond to members of a private interaction hub. A device control service is implemented to determine that the mobile device is moving in a vehicle based on motion data, and can generate a device quiet control to restrict at least audible outputs from one or more of the associated devices that are in the vehicle with the mobile device. The device control service can then initiate communication of the device quiet control to the associated devices in the vehicle to quiet the associated devices that are controllable from the mobile device.

20 Claims, 12 Drawing Sheets

(51) Int. Cl.
*H04W 24/00* (2009.01)
*H04W 4/04* (2009.01)
*H04M 1/725* (2006.01)
*H04M 1/60* (2006.01)

(56) References Cited

U.S. PATENT DOCUMENTS

| | | |
|---|---|---|
| 6,339,826 B2 | 1/2002 | Hayes et al. |
| 6,405,033 B1 | 6/2002 | Kennedy et al. |
| 6,446,069 B1 | 9/2002 | Yaung et al. |
| 6,504,480 B1 | 1/2003 | Magnuson et al. |
| 6,546,002 B1 | 4/2003 | Kim |
| 6,549,768 B1 | 4/2003 | Fraccaroli |
| 6,564,149 B2 | 5/2003 | Lai |
| 6,650,189 B1 | 11/2003 | Romao |
| 6,662,023 B1 | 12/2003 | Helle |
| 6,678,508 B1 | 1/2004 | Koilpillai et al. |
| 6,799,047 B1 | 9/2004 | Bahl et al. |
| 6,847,892 B2 | 1/2005 | Zhou |
| 6,920,455 B1 | 7/2005 | Weschler |
| 6,941,134 B2 | 9/2005 | White |
| 6,990,353 B2 | 1/2006 | Florkey |
| 7,058,659 B2 | 6/2006 | Ryu |
| 7,076,797 B2 | 7/2006 | Loveland |
| 7,096,030 B2 | 8/2006 | Huomo |
| 7,142,848 B2 | 11/2006 | Owen et al. |
| 7,161,914 B2 | 1/2007 | Shoaib et al. |
| 7,171,557 B2 | 1/2007 | Kallahalla et al. |
| 7,212,613 B2 | 5/2007 | Kim et al. |
| 7,222,360 B1 | 5/2007 | Miller |
| 7,272,388 B2 | 9/2007 | Andrew et al. |
| 7,274,925 B2 | 9/2007 | Chaar et al. |
| 7,302,272 B2 | 11/2007 | Ackley |
| 7,305,284 B2 | 12/2007 | Teshima et al. |
| 7,308,255 B2 | 12/2007 | Loveland |
| 7,321,774 B1 | 1/2008 | Lau et al. |
| 7,346,921 B2 | 3/2008 | Murren et al. |
| 7,359,713 B1 | 4/2008 | Tiwari |
| 7,366,798 B2 | 4/2008 | Nordstrom et al. |
| 7,408,506 B2 | 8/2008 | Miller |
| 7,471,929 B2 | 12/2008 | Fujioka et al. |
| 7,530,099 B2 | 5/2009 | Flurry et al. |
| 7,629,891 B1 | 12/2009 | Bell |
| 7,634,455 B1 | 12/2009 | Keene et al. |
| 7,657,849 B2 | 2/2010 | Chaudhri et al. |
| 7,668,830 B2 | 2/2010 | Hakala |
| 7,680,882 B2 | 3/2010 | Tiu, Jr. et al. |
| 7,714,778 B2 | 5/2010 | Dupray |
| 7,796,944 B2 | 9/2010 | Eaton et al. |
| 7,809,350 B2 | 10/2010 | Buckley et al. |
| 7,869,792 B1 | 1/2011 | Zhou et al. |
| 7,898,428 B2 | 3/2011 | Dietz et al. |
| 7,958,562 B2 | 6/2011 | Gaucas |
| 7,961,651 B2 | 6/2011 | Kim et al. |
| 8,046,839 B2 | 10/2011 | Lo |
| 8,244,272 B2 | 8/2012 | Morgan et al. |
| 8,275,352 B2 | 9/2012 | Forstall et al. |
| 8,311,730 B2 | 11/2012 | Neff |
| 8,385,039 B2 | 2/2013 | Rothkopf |
| 8,437,779 B2 | 5/2013 | Phukan |
| 8,477,139 B2 | 7/2013 | Robinet et al. |
| 8,549,657 B2 | 10/2013 | Karlson et al. |
| 8,565,820 B2 | 10/2013 | Riemer et al. |
| 8,657,743 B2 | 2/2014 | Rietzel et al. |
| 8,706,172 B2 | 4/2014 | Priyantha et al. |
| 8,874,162 B2 | 10/2014 | Schrader et al. |
| 8,907,772 B1 | 12/2014 | Green et al. |
| 8,918,119 B2 | 12/2014 | Kim et al. |
| 9,027,117 B2 | 5/2015 | Wilairat et al. |
| 9,066,234 B2 | 6/2015 | Karlson et al. |
| 9,230,076 B2 | 1/2016 | King |
| 2001/0005681 A1 | 6/2001 | Kim |
| 2001/0039587 A1 | 11/2001 | Uhler et al. |
| 2002/0026478 A1 | 2/2002 | Rodgers |
| 2002/0044149 A1 | 4/2002 | McCarthy et al. |
| 2003/0003907 A1 | 1/2003 | Lai et al. |
| 2003/0139192 A1 | 7/2003 | Chmaytelli et al. |
| 2003/0187803 A1 | 10/2003 | Pitt |
| 2004/0007916 A1 * | 1/2004 | Awada et al. ............... 307/10.1 |
| 2004/0015940 A1 | 1/2004 | Heisey et al. |
| 2004/0039909 A1 | 2/2004 | Cheng |
| 2004/0166878 A1 | 8/2004 | Erskine et al. |
| 2004/0192352 A1 | 9/2004 | Vallstrom et al. |
| 2004/0203576 A1 | 10/2004 | Droste et al. |
| 2005/0012640 A1 | 1/2005 | Kong et al. |
| 2005/0037775 A1 | 2/2005 | Moeglein et al. |
| 2005/0055567 A1 | 3/2005 | Libin et al. |
| 2005/0070276 A1 | 3/2005 | McGarry |
| 2005/0107114 A1 | 5/2005 | Ocock et al. |
| 2005/0138110 A1 | 6/2005 | Redlich et al. |
| 2005/0143171 A1 | 6/2005 | Loose |
| 2005/0210104 A1 | 9/2005 | Torvinen |
| 2006/0046706 A1 | 3/2006 | Lin et al. |
| 2006/0053389 A1 | 3/2006 | Michelman |
| 2006/0099970 A1 * | 5/2006 | Staton et al. ............... 455/456.4 |
| 2006/0136998 A1 | 6/2006 | Oowaki et al. |
| 2006/0246872 A1 | 11/2006 | Tarkkala |
| 2006/0253570 A1 | 11/2006 | Biswas et al. |
| 2006/0256005 A1 | 11/2006 | Thandu et al. |
| 2006/0271797 A1 | 11/2006 | Ginggen et al. |
| 2006/0293057 A1 | 12/2006 | Mazerski et al. |
| 2007/0006327 A1 | 1/2007 | Lal et al. |
| 2007/0028176 A1 | 2/2007 | Perdomo et al. |
| 2007/0032225 A1 | 2/2007 | Konicek et al. |
| 2007/0042790 A1 | 2/2007 | Mohi et al. |
| 2007/0046423 A1 | 3/2007 | Baucom |
| 2007/0046456 A1 | 3/2007 | Edwards et al. |
| 2007/0064882 A1 | 3/2007 | Ger et al. |
| 2007/0067655 A1 | 3/2007 | Shuster |
| 2007/0072616 A1 | 3/2007 | Irani |
| 2007/0082707 A1 | 4/2007 | Flynt et al. |
| 2007/0091037 A1 | 4/2007 | Lee |
| 2007/0111726 A1 | 5/2007 | Lanbert et al. |
| 2007/0150826 A1 | 6/2007 | Anzures et al. |
| 2007/0150842 A1 | 6/2007 | Chaudhri et al. |
| 2007/0168971 A1 | 7/2007 | Royzen |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0300140 A1 | 12/2007 | Makela et al. |
| 2008/0014964 A1 | 1/2008 | Sudit et al. |
| 2008/0020803 A1 | 1/2008 | Rios et al. |
| 2008/0032703 A1 | 2/2008 | Krumm |
| 2008/0051079 A1 | 2/2008 | Forsgren |
| 2008/0080688 A1 | 4/2008 | Burgan et al. |
| 2008/0082693 A1 | 4/2008 | Meijer et al. |
| 2008/0096519 A1 | 4/2008 | Miegel |
| 2008/0101658 A1 | 5/2008 | Ahern et al. |
| 2008/0111698 A1 | 5/2008 | Atherton |
| 2008/0140650 A1 | 6/2008 | Stackpole |
| 2008/0154780 A1 | 6/2008 | Soukup et al. |
| 2008/0254767 A1 | 10/2008 | Jin |
| 2008/0256170 A1 | 10/2008 | Hayashi |
| 2008/0268870 A1 | 10/2008 | Houri |
| 2008/0305808 A1 | 12/2008 | Chan et al. |
| 2008/0318595 A1 | 12/2008 | Rofougaran |
| 2009/0005061 A1 | 1/2009 | Ward et al. |
| 2009/0005080 A1 | 1/2009 | Forstall et al. |
| 2009/0006566 A1 | 1/2009 | Veeramachaneni |
| 2009/0006991 A1 | 1/2009 | Lindberg et al. |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0197617 A1 | 8/2009 | Jayanthi |
| 2009/0201896 A1 | 8/2009 | Davis et al. |
| 2009/0205041 A1 | 8/2009 | Michalske |
| 2009/0224931 A1 | 9/2009 | Dietz et al. |
| 2009/0265794 A1 | 10/2009 | Apelqvist |

(56) References Cited

U.S. PATENT DOCUMENTS

| | | |
|---|---|---|
| 2009/0270034 A1* | 10/2009 | Suzuki .............. H04L 29/12113 455/41.2 |
| 2009/0278738 A1 | 11/2009 | Gopinath |
| 2009/0282473 A1 | 11/2009 | Karlson et al. |
| 2009/0298475 A1 | 12/2009 | Czaja et al. |
| 2010/0001967 A1 | 1/2010 | Yoo |
| 2010/0020035 A1 | 1/2010 | Ryu et al. |
| 2010/0056124 A1* | 3/2010 | Keating et al. ................ 455/418 |
| 2010/0066821 A1 | 3/2010 | Rosener et al. |
| 2010/0074450 A1 | 3/2010 | Liao |
| 2010/0115610 A1 | 5/2010 | Tredoux et al. |
| 2010/0127836 A1 | 5/2010 | Huang et al. |
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0217646 A1 | 8/2010 | Siegel |
| 2010/0227588 A1 | 9/2010 | Bradley |
| 2010/0235881 A1 | 9/2010 | Liu |
| 2010/0253503 A1 | 10/2010 | Juang |
| 2010/0255856 A1 | 10/2010 | Kansal et al. |
| 2010/0268779 A1 | 10/2010 | Rao |
| 2010/0285815 A1 | 11/2010 | Treu et al. |
| 2010/0302028 A1 | 12/2010 | Desai et al. |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0324819 A1 | 12/2010 | Nurminen et al. |
| 2011/0010340 A1 | 1/2011 | Hung et al. |
| 2011/0021213 A1 | 1/2011 | Carr |
| 2011/0021234 A1 | 1/2011 | Tibbitts et al. |
| 2011/0047484 A1 | 2/2011 | Mount et al. |
| 2011/0063098 A1 | 3/2011 | Fischer et al. |
| 2011/0065419 A1 | 3/2011 | Book et al. |
| 2011/0070829 A1 | 3/2011 | Griffin et al. |
| 2011/0093161 A1 | 4/2011 | Zhou et al. |
| 2011/0111728 A1 | 5/2011 | Ferguson et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1* | 10/2011 | Lee et al. ..................... 455/41.1 |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti et al. |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0299422 A1 | 12/2011 | Kim et al. |
| 2011/0307166 A1 | 12/2011 | Hiestermann et al. |
| 2011/0319051 A1 | 12/2011 | Reitnour |
| 2011/0319094 A1 | 12/2011 | Usui et al. |
| 2012/0023573 A1 | 1/2012 | Shi |
| 2012/0046020 A1 | 2/2012 | Tomasini |
| 2012/0084691 A1 | 4/2012 | Yun |
| 2012/0084734 A1 | 4/2012 | Wilairat |
| 2012/0084737 A1 | 4/2012 | Gimpl et al. |
| 2012/0098768 A1 | 4/2012 | Bendewald et al. |
| 2012/0100895 A1 | 4/2012 | Priyantha et al. |
| 2012/0115512 A1 | 5/2012 | Grainger et al. |
| 2012/0144468 A1 | 6/2012 | Pratt et al. |
| 2012/0166452 A1 | 6/2012 | Tseng |
| 2012/0166548 A1 | 6/2012 | Gropper |
| 2012/0234058 A1 | 9/2012 | Neil et al. |
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0252418 A1 | 10/2012 | Kandekar |
| 2012/0268249 A1 | 10/2012 | Kansal |
| 2012/0282887 A1 | 11/2012 | Khoo et al. |
| 2012/0289217 A1 | 11/2012 | Riemer et al. |
| 2012/0302256 A1 | 11/2012 | Pai |
| 2012/0306637 A1* | 12/2012 | McGough et al. ............. 340/439 |
| 2012/0317162 A1 | 12/2012 | Endsley et al. |
| 2013/0006469 A1 | 1/2013 | Green et al. |
| 2013/0023246 A9 | 1/2013 | Ellingham et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040654 A1 | 2/2013 | Parish |
| 2013/0040711 A1 | 2/2013 | Kim et al. |
| 2013/0072172 A1 | 3/2013 | Chang et al. |
| 2013/0084847 A1 | 4/2013 | Tibbitts et al. |
| 2013/0130742 A1 | 5/2013 | Dietz et al. |
| 2013/0188503 A1 | 7/2013 | Anepu et al. |
| 2013/0225151 A1 | 8/2013 | King |
| 2013/0225152 A1 | 8/2013 | Matthews, III |
| 2013/0227431 A1 | 8/2013 | Vasudevan |
| 2013/0295872 A1 | 11/2013 | Guday |
| 2013/0298037 A1 | 11/2013 | Matthews |
| 2013/0303143 A1 | 11/2013 | Schrader |
| 2013/0305319 A1 | 11/2013 | Matthews |
| 2013/0305354 A1 | 11/2013 | King |
| 2014/0068755 A1 | 3/2014 | King et al. |
| 2015/0011203 A1 | 1/2015 | Schrader et al. |

FOREIGN PATENT DOCUMENTS

| | | |
|---|---|---|
| CN | 101778165 | 7/2010 |
| CN | 101828162 | 9/2010 |
| EP | 2169946 | 3/2010 |
| EP | 2293016 | 3/2011 |
| EP | 2369864 | 9/2011 |
| EP | 2469442 | 6/2012 |
| JP | 07203015 | 8/1995 |
| JP | 2002142010 | 5/2002 |
| JP | 2002530783 | 9/2002 |
| JP | 2003032353 | 1/2003 |
| JP | 2007257140 | 10/2007 |
| JP | 2009521753 | 6/2009 |
| JP | 2010503082 | 1/2010 |
| KR | 20050037613 | 4/2005 |
| KR | 20100083396 | 7/2010 |
| KR | 20110093528 | 8/2011 |
| KR | 1020110119283 A | 11/2011 |
| WO | WO-2005031544 | 4/2005 |
| WO | 2006054858 A1 | 5/2006 |
| WO | WO-2006088273 | 8/2006 |
| WO | WO-2006099535 | 9/2006 |
| WO | WO-2007130123 | 11/2007 |
| WO | WO-2009105666 | 8/2009 |
| WO | 2011035390 A1 | 3/2011 |
| WO | WO-2011135359 | 11/2011 |
| WO | WO-2012047412 | 4/2012 |
| WO | WO-2013061156 | 5/2013 |

OTHER PUBLICATIONS

"Final Office Action", U.S. Appl. No. 12/194,213, Sep. 20, 2011, 11 Pages.

"Final Office Action", U.S. Appl. No. 12/417,752, Jul. 17, 2013, 18 pages.

"Final Office Action", U.S. Appl. No. 12/417,752, Sep. 13, 2012, 18 pages.

"Final Office Action", U.S. Appl. No. 12/912,456, Jan. 9, 2013, 21 pages.

"Final Office Action", U.S. Appl. No. 12/912,456, Sep. 6, 2013, 22 pages.

"Final Office Action", U.S. Appl. No. 13/090,474, Nov. 21, 2013, 12 pages.

(56) References Cited

OTHER PUBLICATIONS

"Foreign Office Action", CN Application No. 200980128048.8, May 6, 2013, 7 Pages.
"Foreign Office Action", CN Application No. 200980128048.8, Dec. 19, 2012, 11 Pages.
"Ignite Where & Launch Pad", O'Reilly, Where 2.0 Conference 2008, retrieved from <http://en.oreilly.com/where2008/public/schedule/detail/2572> on Feb. 5, 2009,May 2008, 4 pages.
"International Search Report and Written Opinion", Application No. PCT/US2013/050963, Nov. 8, 2013, 14 pages.
"International Search Report and Written Opinion", Application No. PCT/US2009/039509, Nov. 18, 2009, 8 Pages.
"International Search Report and Written Opinion", Application No. PCT/US2012/071557, Mar. 28, 2013, 9 pages.
"International Search Report and Written Opinion", Application No. PCT/US2012/071562, Apr. 24, 2013, 9 pages.
"International Search Report and Written Opinion", Application No. PCT/US2012/034598, Oct. 12, 2012, 9 pages.
"iPad Parental Control (restricting app access)", iPad Reviews, Jailbreak Guides; last retrieved from http://ipaded.net/ipad/parental-control/ on Feb. 29, 2012, 5 pages.
"No Tech Panacea for Tech-Distracted Driving", http://mobile.slashdot.org/story/12/06/11/0556231/no-tech-panacea-for . . . , Dec. 6, 2011, 30 Pages.
"Non Final Office Action", U.S. Appl. No. 12/417,752, Jun. 28, 2011, 14 pages.
"Non Final Office Action", U.S. Appl. No. 13/222,538, Feb. 14, 2013, 33 Pages.
"Non-Final Office Action", U.S. Appl. No. 12/194,213, Mar. 17, 2011, 11 Pages.
"Non-Final Office Action", U.S. Appl. No. 12/417,752, Feb. 25, 2014, 22 pages.
"Non-Final Office Action", U.S. Appl. No. 12/417,752, Oct. 29, 2013, 16 Pages.
"Non-Final Office Action", U.S. Appl. No. 12/417,752, May 24, 2013, 17 pages.
"Non-Final Office Action", U.S. Appl. No. 12/912,456, May 4, 2012, 14 pages.
"Non-Final Office Action", U.S. Appl. No. 12/912,456, May 29, 2013, 20 pages.
"Non-Final Office Action", U.S. Appl. No. 12/912,456, Sep. 11, 2012, 15 pages.
"Non-Final Office Action", U.S. Appl. No. 13/090,474, Apr. 26, 2013, 11 pages.
"Non-Final Office Action", U.S. Appl. No. 13/726,099, Mar. 18, 2014, 8 pages.
"Notice of Allowance", U.S. Appl. No. 12/194,213, May 31, 2013, 11 Pages.
"Notice Of Allowance", U.S. Appl. No. 12/194,213, Jun. 27, 2012, 16 Pages.
"Notice of Allowance", U.S. Appl. No. 12/194,213, Dec. 21, 2012, 13 Pages.
"Notice of Allowance", U.S. Appl. No. 12/912,456, Jan. 7, 2014, 9 Pages.
"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.
"Restriction Requirement", U.S. Appl. No. 13/726,097, Mar. 21, 2014, 7 pages.
"Setting Up Simple Restricted Access", Retrieved at: http://support.webvanta.com/support_article/615777-setting-up-simple-restricted-access—on Feb. 29, 2012, 3 Pages.
"What's an Android? And Other Smart(phone) Questions", Retrieved from: <http://bestbuybusinessdistrict.com/knowlege-center/58-what%27s-an-android-and-other-smart-phone-questions> on Feb. 7, 2011, Sep. 6, 2010, 4 pages.
Aalto, et al., "Bluetooth and WAP Push Based Location-Aware Mobile Advertising System", ACM, MobiSYS '04, Jun. 6-9, 2004, Boston, MA, retrieved from <http://www.mediateam.oulu.fi/publications/pdf/496.pdf> on Feb. 5, 2009,Jun. 6, 2004, 10 pages.
Abdelzaher, et al., "Mobiscopes for Human Spaces", IEEE Pervasive Computing, vol. 6, No. 2, Apr. 2007, 11 pages.
Abdesslem, et al., "Less is More: Energy-Efficient Mobile Sensing with SenseLess", MobiHeld an ACM SIGCOMM workshop, Aug. 17, 2009, pp. 61-62.
Agarwal, et al., "Somniloquy: Augmenting Network Interfaces to Reduce PC Energy Usage", Symposium on Networked Systems Design and Implementation (NSDI), 2009, available at <http://www.usenix.org/events/nsdi09/tech/full_papers/agarwal/agarwal.pdf>,Apr. 23, 2009, pp. 365-380.
Aventail, et al., "Aventail and Trust Digital Launch Integrated Secure Mobile Access Solution", http://findarticles.com/p/articles/mi_pwwi/is_200602/ai_n16063742/?tag=content;col1, Last accessed May 14, 2008,Feb. 2006, 3 Pages.
Azizyan, et al., "SurroundSense: Mobile Phone Localization Using Ambient Sound and Light", retrieved from <http://synrg.ee.duke.edu/papers/surroundsense-poster.pdf> on Feb. 5, 2009, Sep. 22, 208, 1 page.
Bahl, et al., "RADAR: An In-Building RF-based User Location and Tracking System", Microsoft Research, Proceedings of IEEE Infocom 2000, Tel-Aviv, Israel, retrieved from <https://3 research.microsoft.com/en-us/um/people/padmanab/papers/infocom2000.pdf> on Feb. 5, 2009,Mar. 2000, 10 pages.
Balakrishnan, et al., "ITR: Scalable Location-Aware Monitoring (SLAM) Systems", Laboratory for Computer Science & Department of EECS, MIT, Cambridge, MA, retrieved from <http://nms.lcs.mit.edu/projects/slam/prop.pdf> on Feb. 5, 2009,Nov. 9, 2001, 31 pages.
Barroso, et al., "The Case for Energy-Proportional Computing", IEEE Computer Society, vol. 40. No. 12, Dec. 2007, pp. 33-37.
Branscombe, "Kids Corner and Wallet", Retrieved from <http://www.techradar.com/reviews/pc-mac/software/operating-systems/windows-phone-8-1086692/review/6>, Jan. 25, 2012, 7 pages.
Burke, et al., "Participatory Sensing", WSW at SenSys, Oct. 31, 2006, 5 pages.
Campbell, et al., "Biometrically Enhanced Software-Defined Radios", Proc. Software Defined Radio Technical Conf, Orlando, Florida, Nov. 2003, 6 Pages.
Chiu, et al., "Playful Bottle: A Mobile Social Persuasion System to Motivate Healthy Water Intake", Proceedings of the 11th international conference on Ubiquitous computing, 2009, 10 pages.
Consolvo, "Flowers or a Robot Army?: Encouraging Awareness & Activity with Personal, Mobile Displays", Proceedings of the 10th International Conference on Ubiquitous Computing, vol. 12, No. 4, Publisher: ACM Press, Sep. 2008, 10 pages.
Constandache, et al., "Energy-Aware Localization Using Mobile Phones", retrieved from <http://www.cs.duke.edu/~ionut/2008_mobisys.pdf> on Feb. 5, 2009, Jun. 2008, 1 page.
Constandache, et al., "Energy-efficient Localization Via Personal Mobility Profiling", In Proceedings of MobiCASE 2009, Available at <http://synrg.ee.duke.edu/papers/mobicase09.pdf>,Oct. 2009, pp. 1-20.
Covington, et al., "Parameterized Authentication", Proc. 9th European Symposium on Research Computer Security, Lecture notes in Computer Science, Sep. 2004, 18 Pages.
Flinn, "Extending Mobile Computer Battery Life through Energy-Aware Adaptation", School of Computer Science, Carnegie Mellon University, Pittsburgh, PA, retrieved from <http://reports-archive.adm.cs.cmu.edu/anon/2001/CMU-CS-01-171.pdf> from Feb. 5, 2009,Dec. 2001, 165 pages.
Foster, et al., "Precision and accuracy of an ankle-worn accelerometer-based pedometer in step counting and", Preventive Medicine, vol. 41, No. 3-4, Oct. 2005, pp. 778-783.
Gaonkar, et al., "Micro-Blog: Sharing and Querying Content through Mobile Phones and Social Participation", ACM, MobiSys 2008, Jun. 17-20, 2008, Breckenridge, CO, retrieved from <http://www.cs.duke.edu/~lpcox/romit-microblog.pdf> on Feb. 5, 2009,Jun. 17, 2008, 13 pages.
Hoffmann, et al., "Multilateral Security in Mobile Applications and Location Based Services", https://users.cs.jmu.edu/bernstdh/web/CS685/papers/hoffman-et-al-2002.pdf, Last accessed May 14, 2008,2002, 18 Pages.

(56) References Cited

OTHER PUBLICATIONS

Hoh et al., "Virtual Trip Lines for Distributed Privacy-Preserving Traffic Monitoring", Proceedings of the 6th International Conference on Mobile Systems, Applications, and Services, Jun. 2008, 14 pages.

Hull, et al., "CarTel: A Distributed Mobile Sensor Computing System", Proceedings of the 4th international conference on Embedded networked sensor systems, Nov. 2006, 14 pages.

Jagadeesan, et al., "A Novel Approach to Design of User Re-Authentication Systems", Proc. 3rd IEEE Intl. Conf. on Biometrics: Theory, Applications and Systems, Sep. 2009, 6 Pages.

Kang, et al., "A Scalable and Energy-Efficient Context Monitoring Framework for Mobile Personal Sensor Networks", IEEE Transactions on Mobile Computing, vol. 9, No. 5, May 2010, pp. 686-702.

Kansal, et al., "Location and Mobility in a Sensor Network of Mobile Phones", Microsoft Research, Microsoft Corporation, retrieved from <http://research.microsoft.com.com/apps/pubs/default.aspx?id=70416> on Feb. 5, 2009,Jun. 4, 2007, 1 pages.

King, et al., "Mobile Device Child Share", U.S. Appl. No. 13/726,095, Mar. 21, 2013, 57 Pages.

Klosterman, et al., "Secure Continuous Biometric-Enhanced Authentication", Technical Report, May 2000, 25 Pages.

Kottahachchi, et al., "Access Controls for Intelligent Environments", In: Proceedings of ISDA '04: 4th Annual International Conference on Intelligent Systems Design and Applications. Budapest, Hungary (2004), 6 Pages.

Krumm, et al., "Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009,Sep. 17, 2006, 18 pages.

Krumm, et al., "RightSPOT: A Novel Sense of Location for a Smart Personal Object", Proceedings of Ubicomp 2003, Seattle, WA, retrieved from <http://research.microsoft.com/en-us/um/people/horvitz/rightspot.htm> on Feb. 5, 2009,2003, 1 pages.

Lamarca, et al., "Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009,2005, 18 pages.

Lester, et al., "Validated Caloric Expenditure Estimation using a Single Body-Worn Sensor", Proceedings of the 11th international conference on Ubiquitous computing, Oct. 2009, 10 pages.

Lester, et al., "A Practical Approach to Recognizing Physical Activities", Pervasive Computing in Pervasive Computing, vol. 3968, 2006, 17 pages.

Liao, et al., "Extracting Places and Activities from GPS Traces Using Hierarchical Conditional Random Fields", The International Journal of Robotics Research, vol. 26, No. 1, 119-134, retrieved from <http://ijr.sagepub.com/cgi/content/26/1/119> on Feb. 5, 2009,2007, 20 pages.

Lin, et al., "Enabling Energy-Efficient and Quality Localization Services", National Taiwan University, retrieved from <http://nslab.ee.ntu.edu.tw/publication/conf/qols-percom06.pdf> on Feb. 5, 2009,2006, 4 pages.

Lin, et al., "Energy-Accuracy Trade-off for Continuous Mobile Device Location", In Proceedings of ACM Mobisys 2010, Available at <http://research.microsoft.com/apps/pubs/default.aspx?id=120831>,Jun. 15, 2010, pp. 1-14.

Liu, et al., "xShare: Supporting Impromptu Sharing of Mobile Phones", In Proceedings of the 7th international conference on Mobile systems, applications, and services, Jun. 22, 2009, pp. 15-28.

Lu, et al., "Sound Sense: Scalable Sound Sensing for People-Centric Sensing Applications on Mobile Phones", Proceedings of the 7th international conference on Mobile systems, applications, and services, Jun. 2009, 14 pages.

McGlaun, "Fixes for Distracted Driving Remain Unclear", http://www.dailytech.com/article.aspx?newsid=24903, Jun. 12, 2012, 2 Pages.

Mohan, et al., "Nericell: Rich Monitoring of Road and Traffic Conditions using Mobile Smartphones", Proceedings of the 6th ACM conference on Embedded network sensor systems, Nov. 2008, 14 pages.

Oliver, et al., "Health Gear: A Real-Time Wearable System for Monitoring and Analyzing Physiological Signals", Apr. 2006, pp. 1-4.

Paek, et al., "Energy-Efficient Rate-Adaptive GPS-based Positioning for Smartphones", In Proceedings of MobiSys 2010, Available at <http://enl.usc.edu/papers/cache/Paek10a.pdf>,Jun. 2010, 16 pages.

Peng, et al., "BeepBeep: A High Accuracy Acoustic Ranging System Using COTS Mobile Devices", ACM, SenSys 2007, Nov. 6-9, 2007, Sydney, Australia, retrieved from <http://research.microsoft.com/en-us/groups/wn/sensys106-beepbeep.pdf> on Feb. 5, 2009,Nov. 6, 2007, 14 pages.

Pering, et al., "The PSI Board: Realizing a Phone-Centric Body Sensor Network", In 4th International Workshop on Wearable and Implantable Body Sensor Networks, 2007, 6 pages.

Person, "Writing Your Own GPS Applications: Part 2", The Code Project, retrieved from <http://www.codeproject.com/KB/mobile/WritingGPSApplications2.aspx> on Feb. 5, 2009,Dec. 20, 2004, 13 pages.

Quick, "BizzTrust for Android splits a single smartphone into two virtual phones", http://www.gizmag.com/bizztrust-for-android/20114/, Retrieved on Jan. 10, 2012,Oct. 2011, 4 Pages.

Riva, et al., "The Urbanet Revolution: Sensor Power to the People!", IEEE Pervasive Computing, vol. 6, No. 2, Apr. 2007, pp. 41-49.

Ruairi, et al., "An Energy-Efficient, Multi-Agent Sensor Network for Detecting Diffuse Events", IJCA1-07—retrieved from <http://www.aaai.org/Papers/IJCAI/2007/IJCAI07-224.pdf> on Feb. 5, 2009, 2007, pp. 1390-1395.

Schindler, et al., "City-Scale Location Recognition", IEEE Computer Society Conference on Computer Vision and Pattern Recognition (CVPR), retrieved from <http://www.cc.gatech.edu/~phlosoft/files/schindler07cvpr2.pdf> on Feb. 5, 2009,2007, 7 pages.

Shin, et al., "DEAMON: Energy-efficient sensor monitoring", 6th Annual IEEE Communications Society Conference on Sensor, Mesh and Ad Hoc Communications and Networks, Jun. 22, 2009, 9 pages.

Simonite, "One Smart Phone, Two Personalities", http://www.technologyreview.com/communications/38865/, Retrieved Jan. 10, 2012,Oct. 13, 2011, 3 Pages.

Smailagic, et al., "Location Sensing and Privacy in a Context-Aware Computing Environment", IEEE Wireless Communications—retrieved from <http://diuf.unifr.ch/pai/education/2002_ 2003/seminar/winter/telecom/01043849.pdf> on Feb. 5, 2009, Oct. 2002, pp. 10-17.

Stajano, "One user, many hats; and, sometimes, no hat?towards a secure yet usable pda", Security Protocols Workshop, Springer Verlag, 2004, 14 Pages.

Sun, et al., "Signal Processing Techniques in Network-aided Positioning", IEEE Signal Processing Magazine—Available at <http://www.cspl.umd.edu/sig/publications/sun_survey_200507.pdf>, Jul. 2005, pp. 12-23.

Talbot, "App Battles Driver Distraction but Spares Passengers", Technology Review India published by MIT, http://www.technologyreview.in/news/426889/app-battles-driver-distraction-but-spares-passengers,Feb. 14, 2012, 2 pages.

Temporale, "Removing Application Lock on Windows Mobile Standard Devices", http://www.mobilejaw.com/articles/2009/09/removing-application-lock-on-windows-mobile-standard-devices/, Retrieved on Oct. 13, 2011,Sep. 4, 2009, 10 Pages.

Wang, et al., "A Framework of Energy Efficient Mobile Sensing for Automatic User State Recognition", Proceedings of the 7th international conference on Mobile systems, applications, and services, Jun. 2009, 14 pages.

Weilenmann, et al., "Local Use and Sharing of Mobile Phones", In B. Brown, N. Green & R. Harper (Eds.) Wireless World: Social and Interactional Aspects of the Mobile Age. Godalming and Hiedleburg: Springer Verlag, 2001, pp. 99-115.

Woodman, et al., "Pedestrian Localisation for Indoor Environments", Proceedings of the 10th international conference on Ubiquitous computing, Sep. 2008, 10 pages.

(56) References Cited

OTHER PUBLICATIONS

Youssef, et al., "The Horus WLAN Location Determination System", Department of Computer Science, University of Maryland, retrieved from <http://www.cs.umd.edu/~moustafa/papers/horus_usenix.pdf> on Feb. 5, 2009,2005, 14 pages.

Yu, et al., "Personalized Awareness and Safety with Mobile Phones as Sources and Sinks", Proceedings of Urbansense, workshop held in conjunction with SenSys, Nov. 4, 2008, pp. 26-30.

Zaplata, "Context-based Cooperation in Mobile Business Environments—Managing the Distributed Execution of Mobile Processes", Business & Information Systems Engineering, Apr. 2009, pp. 301-314.

Zhang, et al., "The Two Facets of the Exploration-Exploitation Dilemma", Proceedings of the IEEE/WIC/ACM International Conference on Intelligent Agent Technology (IAT '06), retrieved from <http://ieeexplore.ieee.org/ielx5/4052878/4052879/04052945.pdf?tp=> on Feb. 5, 2009,2006, 7 pages.

Zhuang, et al., "Improving Energy Efficiency of Location Sensing on Smartphones", In Proceedings of MobiSys 2010—Available at <http://www.deutsche-telekom-laboratories.com/~kyuhan/papers/MobiSys10Kim.pdf>, Jun. 2010, 15 pages.

"Mobile Task Tracker Screen Shots", Retrieved from <http://www.mobiletasktrackercom/Screen%20Shots.html>, (Jul. 13, 2011), 4 Pages.

"PCT Search Report and Written Opinion", Application No. PCT/US2012/071545, (Mar. 28, 2013), 9 pages.

"PCT Search Report and Written Opinion", Application No. PCT/US2012/071559, (Mar. 28, 2013),10 pages.

"PCT Search Report and Written Opinion", Application No. PCT/US2012/071555, (Apr. 25, 2013), 9 pages.

"PCT Search Report and Written Opinion", Application No. PCT/US2012/071546, (Apr. 29, 2013),10 pages.

Cui, Yanqing "Facilitating Consumption of Online Social Networking Services on Mobile Devices", *Proceedings of the 13th international conference on Ubiquitious Computing*, (Sep. 17, 2011), 4 Pages.

Niino, Junichi "There was free enterprise microblogging, Japanese were developed "youRoom!" Free plan upgrade just mutter", Retrieved from <http://www.publickey1.jp/blog/10/youroom.html>, (Dec. 21, 2010), 4 Pages.

"BroadCloud FamilyCenter", *BroadSoft Data Sheet*, retrieved from <http://www.broadsoft.com/pdf/datasheet-broadcloud-familycenter.pdf> on Dec. 13, 2011, 1 page.

"Distracted Driving Information Clearinghouse", Retrieved from <http://www.fcc.gov/encyclopedia/distracted-driving-information-clearinghouse>, (Jul. 27, 2011), 4 pages.

"iCloud: What You Need to Know", MacWorld.com, retrieved from <http://www.macworld.com/article/160380/2011/06/icloud_what_you_need_to_know.html> on Dec. 13, 2011,(Jun. 8, 2011),16 pages.

"Parental Control Software for Cell Phones", retrieved from <http://www.parentalcontrolcellphones.com/> on Dec. 8, 2011,(Apr. 30, 2010), 5 pages.

"Safe Driving System", Retrieved from <http://web.archive.org/web/20100512220953/http://key2safedriving.com/>, (May 12, 2010), 2 pages.

"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011,(Jan. 7, 2010), 2 pages.

Bilderbeek, Pim "From Unified to Social Communications and Collaboration", retrieved from <http://www.themetisfiles.com/2011/10/from-unified-to-social-communications-and-collaboration/> on Dec. 13, 2011,(Oct. 25, 2011), 4 pages.

Davies, Chris "T-Mobile UK to Offer ICD Vega 15-inch Tegra Android Tablet in 2010", Retrieved from <http://www.slashgear.com/t-mobile-uk-to-offer-icd-vega-15-inch-tegra-android-tablet-in-2010-0768671/> on Mar. 11, 2013, (Jan. 7, 2010), 7 pages.

Dipane, Jared "Sprint to Bring Parental Locks to Android Phones to Prevent Use While Driving", retrieved from <http://www.androidcentral.com/sprint-bring-parental-locks-android-phones-prevent-use-while-driving> on Dec. 8, 2011,(Mar. 22, 2011), 7 pages.

Kharif, Olga "Parental Controls for Mobile Phones? You Bet", *Tech Beat*, retrieved from <http://www.businessweek.com/the_thread/techbeat/archives/2005/08/parental_contro.html> on Dec. 8, 2011,(Aug. 16, 2005),12 pages.

Leblanc, Brandon "The Device Experience in Windows 7—Updated", *Windows 7 Team Blog*, retrieved from <http://windowsteamblog.com/windows/archive/b/windows7/archive/2009/09/01/the-device-experience-in-windows-7-updated.aspx> on Dec. 13, 2011,(Sep. 1, 2009),14 pages.

Mui, Chunka "The Lifesaving Smartphone Feature That We Need: Driving Mode", Retrieved from <http://www.forbes.com/sites/chunkamui/2011/12/19/the-smart-phone-feature-that-we-need-driving-mode/>, (Dec. 19, 2011), 4 pages.

Nasar, Jack et al., "Mobile Telephones, Distracted Attention, and Pedestrian Safety", *Accident Analysis & Prevention*, retrieved from <http://facweb.knowlton.ohiostate.edu/jasar/crpinfo/research/MobilePhones_AAP_2007.pdf> on Dec. 8, 2011,(Jan. 2008), pp. 69-75.

Patten, Christopher J., et al., "Using Mobile Telephones: Cognitive Workload and Attention Resource Allocation", *Accident Analysis and Prevention*, retrieved from <http://beta.nsc.org/safety_road/Distracted_Driving/Documents/Using%20mobile%20telephones,%20cognitive%20workload%20and%20attention%-20resource%20allocation.pdf> on Dec. 8, 2011,(May 2004), pp. 341-350.

Saenz, Aaron "Unlock Your Door with Your Phone, Text a Key to a Friend—Lockitron is Awesome (video)", Retrieved from: <http://singularityhub.com/2011/05/24/unlock-your-door-with-your-phone-text-a-key-to-a-friend-lockitron-is-awesome-video/> on Feb. 10, 2012,(May 24, 2011), 4 pages.

Tiemann, Amy "AT&T Adds Parental Control Options to Cell Phones", *CNET News*, retrieved from <http://news.cnet.com/8301-13507_3-9770506-18.html> on Dec. 8, 2011,(Sep. 7, 2007), 1 pages.

Warren, Tom "Microsoft Flaunts Metro Style PowerPoint Live Tiles", *WinRumors*, retrieved from <http://www.winrumors.com/microsoft-flaunts-metro-style-powerpoint-live-tiles-video/> on Dec. 13, 2011,(Jul. 11, 2011),12 pages.

Williams, Harold "AT&T Drive Mode, The Anti-Texting While Driving Mobile Solution (video)", Retrieved from <http://www.talkandroid.com/66579-att-drive-mode-the-anti-texting-while-driving-mobile-solution-video/>, (Oct. 13, 2011), 6 pages.

Wood, Molly "Hey, Phone Makers: Where's 'Driving Mode'?", Retrieved from <http://news.cnet.com/8301-31322_3-20003824-256.html>, (Apr. 29, 2010), 3 pages.

"Welcome to Sprint Drive First", Retrieved at <<https://drivefirst.sprint.com/welcome.htm>> on Nov. 20, 2013, (2013), 2 pages.

Samberg, David "Stay Focused While Driving", Retrieved from <<http://www.verizonwireless.com/news/2012/09/safely-go-driving-app.html>> on Nov. 20, 2013, (Sep. 13, 2012), 5 pages.

"Corrected Notice of Allowance", U.S. Appl. No. 13/726,097, Aug. 21, 2014, 2 pages.

"Corrected Notice of Allowance", U.S. Appl. No. 13/726,097, Oct. 1, 2014, 2 pages.

"Final Office Action", U.S. Appl. No. 13/726,090, Oct. 2, 2014, 30 pages.

"Final Office Action", U.S. Appl. No. 13/726,099, Aug. 29, 2014, 10 pages.

"Foreign Office Action", AU Application No. 2011312743, Aug. 15, 2014, 4 Pages.

"Non-Final Office Action", U.S. Appl. No. 13/726,043, Sep. 11, 2014, 14 pages.

"Non-Final Office Action", U.S. Appl. No. 13/875,139, Oct. 24, 2014, 15 Pages.

"Notice of Allowance", U.S. Appl. No. 12/897,586, Oct. 15, 2014, 13 Pages.

"Final Office Action", U.S. Appl. No. 13/222,538, May 28, 2013, 43 pages.

"Final Office Action", U.S. Appl. No. 13/875,139, May 9, 2014, 15 Pages.

(56) References Cited

OTHER PUBLICATIONS

"Foreign Notice of Allowance", CN Application No. 200980128048.8, Jun. 28, 2014, 6 Pages.
"Foreign Office Action", AU Application No. 2011312743, Jun. 20, 2014, 4 Pages.
"Foreign Office Action", CN Application No. 200980128048.8, Dec. 2, 2013, 7 pages.
"Foreign Office Action", CN Application No. 201110317851.5, Dec. 4, 2013, 14 pages.
"Foreign Office Action", CN Application No. 201110317851.5, May 8, 2014, 10 Pages.
"Foreign Office Action", EP Application No. 11831134.9, May 9, 2014, 3 Pages.
"International Search Report and Written Opinion", Application No. PCT/US2011/049614, Mar. 26, 2012, 7 pages.
"Non-Final Office Action", U.S. Appl. No. 12/897,586, May 8, 2014, 12 pages.
"Non-Final Office Action", U.S. Appl. No. 13/222,538, Oct. 11, 2013, 38 pages.
"Non-Final Office Action", U.S. Appl. No. 13/328,312, Aug. 6, 2013, 18 pages.
"Non-Final Office Action", U.S. Appl. No. 13/726,027, Jun. 24, 2014, 17 pages.
"Non-Final Office Action", U.S. Appl. No. 13/726,090, Jun. 24, 2014, 28 pages.
"Non-Final Office Action", U.S. Appl. No. 13/875,139, Oct. 3, 2013, 12 pages.
"Notice of Allowance", U.S. Appl. No. 13/726,097, Jun. 10, 2014, 7 pages.
"Restriction Requirement", U.S. Appl. No. 13/726,049, Jul. 1, 2014, 6 pages.
"Supplementary Search Report", EP Application No. 11831134.9, Apr. 3, 2014, 3 pages.
Moran, et al., "Getting Started with Windows 7", 2009, 412 pages.
"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.
"Final Office Action", U.S. Appl. No. 12/417,752, Feb. 25, 2014, 22 Pages.
"Final Office Action", U.S. Appl. No. 13/090,474, Nov. 25, 2014, 13 pages.
"Final Office Action", U.S. Appl. No. 13/726,027, Jan. 5, 2015, 19 pages.
"Final Office Action", U.S. Appl. No. 13/726,043, Mar. 3, 2015, 19 pages.
"Foreign Notice of Allowance", AU Application No. 2011312743, Nov. 25, 2014, 2 Pages.
"Foreign Office Action", CL Application No. 201200886, Feb. 3, 2015, 6 Pages.
"Foreign Office Action", CN Application No. 201110317851.5, Nov. 14, 2014, 15 Pages.
"Foreign Office Action", EP Application No. 12859485.0, Feb. 12, 2015, 5 pages.
"Foreign Office Action", EP Application No. 12860631.6, Feb. 16, 2015, 5 pages.
"How can I see a list of all users on the logon screen?", Retrieved from <http://superuser.com/questions/354856/how-can-i-see-a-list-of-all-users-on-the-logon-screen> on Jan. 6, 2015, Nov. 7, 2011, 2 pages.
"How can one add an image to the windows 7 login screen? A", Retrieved from <http://superuser.com/questions/470568/how-can-one-add-an-image-to-the-windows-7-login-screen > on Jan. 6, 2015., Sep. 5, 2012, 4 pages.
"In Case of Emergency (ICE) and smart phone with lock screens", Ars Technica Open Forum—Retrieved at: http://arstechnica.com/civis/viewtopic.php?f=20&t=1140661, Mar. 29, 2011, 8 pages.
"Non-Final Office Action", U.S. Appl. No. 13/090,474, May 6, 2014, 12 pages.
"Non-Final Office Action", U.S. Appl. No. 13/726,040, Jan. 28, 2015, 14 pages.
"Non-Final Office Action", U.S. Appl. No. 13/726,049, Dec. 4, 2014, 9 pages.
"Non-Final Office Action", U.S. Appl. No. 13/726,092, Feb. 12, 2015, 21 pages.
"Non-Final Office Action", U.S. Appl. No. 13/726,095, Jan. 5, 2015, 14 pages.
"Non-Final Office Action", U.S. Appl. No. 13/726,095, Aug. 15, 2014, 12 pages.
"Non-Final Office Action", U.S. Appl. No. 13/726,099, Jan. 7, 2015, 10 pages.
"Notice of Allowance", Jan. 5, 2015, 12 Pages.
"Restrict Access to Programs with AppLocker in Windows 7", Retrieved from <http://www.howtogeek.com/howto/6317/block-users-from-using-certain-applications-with-applocker/> on Jan. 6, 2015., Nov. 12, 2009, 9 pages.
"Supplemental Notice of Allowance", U.S. Appl. No. 12/897,586, Mar. 3, 2015, 2 Pages.
"Supplementary European Search Report", EP Application No. 12860631.6, Jan. 5, 2015, 3 pages.
"Timeline of Microsoft Windows", Retrieved from <http://en.wikipedia.org/wiki/Timeline_of_Microsoft_Windows> on Jan. 6, 2015, Dec. 14, 2014, 5 pages.
Lifehacker, "Get the Most Out of Your iPhone's Notification Center, from Beginner to Jailbreaker", Available online at <http://lifehacker.com/5882947/get-the-most-out-of-ios-Ss-notification-center-frombeginner-to-jailbreakerl>, retrieved on Jul. 29, 2014, Feb. 7, 2012, 8 pages.
Osxdaily, "How to Use the lock Screen Camera in iOS 5.1", Available online at <http://osxdaily.com/2012/03/08/lock-screen-camera-ios-5-1>, retrieved on Jul. 29, 2014, Mar. 8, 2012, 10 pages.
Raja, "How to Replace and Customize Android Lock Screen [Guide]", Retrieved at: http://www.addictivetips.com/mobile/how-to-replace-and-customize-android-lock-screen-guide/, Jun. 10, 2011, 14 pages.
"Supplementary European Search Report", EP Application No. 12859485.0, Jan. 23, 2015, 4 pages.
"Extended European Search Report", EP Application No. 12859600.4, May 13, 2015, 7 pages.
"Final Office Action", U.S. Appl. No. 13/726,095, May 8, 2015, 13 pages.
"Final Office Action", U.S. Appl. No. 13/726,099, May 8, 2015, 11 pages.
"Foreign Office Action", CL Application No. 201300886, Feb. 2, 2015, 7 pages.
"Foreign Office Action", EP Application 12859972.7, May 26, 2015, 4 pages.
"Mobile Phone Match-Up", Retrieved at: <http://www.microsoft.com/windowsmobile/enus/meet/version-compare.mspx>, Jul. 27, 2010, 4 pages.
"Notice of Allowance", U.S. Appl. No. 13/875,139, Mar. 5, 2015, 7 pages.
"Setting up and Using Smart Unlock on the Samsung Jet", Retrieved at: <http://www.knowyourmobile.com/samsung/samsungjet/samsungjetuserguides/317988/setting_up_and_using_smart_unlock_on_the_samsung_jet.html>, Jun. 20, 2010, 2 pages.
"Supplementary European Search Report", EP Application No. 12859972.7, Apr. 30, 2015, 3 pages.
"T-Mobile G1 Google Android Phone—Gesture Unlocking", Retrieved at: <http://www.gadgetuniversegift.com/?p=2121>, Jun. 20, 2010, 2 pages.
"T-Mobile G1 User Manual", pp. 102-103, May 27, 2009, 5 pages.
Bhandari,"Full Touchscreen Samsung Star (S5233), Star 3G (S5603) and BEAT DJ Launched in India", Retrieved at: http://www.tecfre.com/full-touchscreen-samsung-star-s5233-star-3g-s5603-and-beat-dj-launched-in-india/, May 11, 2009, 12 pages.
Chen,"Here's the Google Phone Apple Wants You to Have", Retrieved at: http://www.wired.com/2010/03/apple-htc-google/, Mar. 5, 2010, 9 pages.
Ciprian,"Manage User Accounts", Retrieved at: http://www.vista4beginners.com/Manage-User-Accounts, May 8, 2007, 13 pages.

(56) References Cited

OTHER PUBLICATIONS

U.S. Appl. No. 13/726,049, Amendment dated Sep. 15, 2015, 17 pages.
U.S. Appl. No. 13/726,049, Amendment dated Mar. 3, 2015, 14 pages.
U.S. Appl. No. 13/726,049, Response to Restriction Requirement dated Aug. 2, 2014, 8 pages.
U.S. Appl. No. 13/726,049, Preliminary Amendment dated Nov. 26, 2013, 7 pages.
U.S. Appl. No. 13/726,095, Preliminary Amendment dated Dec. 11, 2013, 10 pages.
U.S. Appl. No. 13/726,095, Amendment dated Nov. 17, 2014, 18 pages.
U.S. Appl. No. 13/726,095, Amendment dated Aug. 6, 2015, 11 pages.
U.S. Appl. No. 13/726,095, Notice of Allowance dated Aug. 28, 2015, 7 pages.
U.S. Appl. No. 13/726,043, Preliminary Amendment dated Dec. 10, 2013, 9 pages.
U.S. Appl. No. 13/726,043, Amendment dated Dec. 30, 2014, 17 pages.
U.S. Appl. No. 13/726,043, Amendment dated May 12, 2015, 16 pages.
U.S. Appl. No. 13/726,043, Office Action dated Oct. 8, 2015, 20 pages.
U.S. Appl. No. 12/897,586, Amendment dated Apr. 15, 2013, 13 pages.
U.S. Appl. No. 12/897,586, Amendment dated Sep. 19, 2013, 12 pages.
U.S. Appl. No. 12/897,586, Amendment dated Aug. 20, 2014, 15 pages.
U.S. Appl. No. 14/681,923, Preliminary Amendment dated Apr. 8, 2015, 8 pages.
U.S. Appl. No. 13/726,090, Preliminary Amendment dated Nov. 26, 2013, 9 pages.
U.S. Appl. No. 13/726,090, Amendment dated Sep. 24, 2014, 16 pages.
U.S. Appl. No. 13/726,090, Amendment dated Jan. 14, 2015, 19 pages.
U.S. Appl. No. 13/726,090, Amendment dated Aug. 17, 2015, 17 pages.
U.S. Appl. No. 14/495,418, Amendment dated Aug. 19, 2015, 11 pages.
U.S. Appl. No. 14/495,418, Notice of Allowance mailed Oct. 7, 2015, 7 pages.
European Patent Application No. 12859972.7, Response to Official Communication, dated Jul. 23, 2015, 17 pages.
European Patent Application No. 12860373.5, Response to Official Communication, dated Oct. 14, 2015, 16 pages.
European Patent Application No. 12859485.0, Response to Official Communication, dated Jun. 10, 2015, 20 pages.
European Patent Application No. 12859600.4, Response to Official Communication, dated Aug. 10, 2015, 19 pages.
European Patent Application No. 12860631.6, Response to Official Communication, dated Jun. 9, 2015, 17 pages.
Chinese Patent Application No. 201110317851.5, Amendment dated Jan. 8, 2014, 20 pages (including English translation of claims).
Chinese Patent Application No. 201110317851.5, Amendment dated Jul. 22, 2014, 17 pages (including English translation of claims).
Chinese Patent Application No. 201110317851.5, Amendment dated Jan. 28, 2015, 15 pages (including English translation of claims).
Chinese Patent Application No. 201110317851.5, Amendment dated Aug. 3, 2015, 60 pages (including English translation of claims).
Australian Patent Application No. 2011312743, Amendment dated Jul. 18, 2014, 22 pages.
Australian Patent Application No. 2011312743, Amendment dated Sep. 22, 2014, 6 pages.
Chilean Patent Application No. 886-2013, Amendment dated Apr. 10, 2015, 15 pages.
Chilean Patent Application No. 886-2013, Amendment dated Aug. 6, 2015, 6 pages.
European Patent Application No. 11831134.9, Response to Official Communication, dated Jun. 12, 2014, 10 pages.
Israeli Patent Application No. 225450, Office Action dated Aug. 13, 2015, 6 pages.
Japanese Patent Application No. 2013-532806, Amendment dated Aug. 14, 2015, 13 pages (including English translation of claims).
Japanese Patent Application No. 2013-532806, Notice of Allowance dated Oct. 2, 2015, 3 pages.
Hayama, et al., "Windows Vista Home Premium/Home Basic/Business", Mar. 21, 2007, pp. 748-776.
"Location-Based Social Networking Marketing White Paper", The Marketer's Guide to Location-Based Social Networks, Anvil Media, Inc., 2010,14 pages.
"Supplementary European Search Report", EP Application No. 12860403.0, May 4, 2015, 3 pages.
"Foreign Office Action", EP Application No. 12860403.0, May 20, 2015, 4 pages.
Cramer,"Performing a Check-in: Emerging Practices, Norms and 'Conflicts' in Location-Sharing Using Foursquare", MOBILECHII 2011 ACM 2011 10 pages.
PCT Application No. PCT/US2012/071544, International Search Report dated Dec. 23, 2012, 9 pages.
U.S. Appl. No. 13/726,031, Preliminary Amendment dated Apr. 8, 2014, 8 pages.
U.S. Appl. No. 13/726,031, Office Action dated Jul. 8, 2014, 13 pages.
U.S. Appl. No. 13/726,031, Amendment dated Dec. 1, 2014, 11 pages.
U.S. Appl. No. 13/726,031, Final Office Action dated Apr. 13, 2015, 14 pages.
U.S. Appl. No. 13/726,031, Amendment dated Jun. 3, 2015, 13 pages.
U.S. Appl. No. 13/726,031, Office Action dated Aug. 27, 2015, 17 pages.
Morton, Lynn "6 Geolocation Apps You May Not Have Heard About", retrieved from <http://www.r2integrated.com/blog/index.php/6-geolocation-apps-you-may-not-haveheard-of/> on Dec. 9, 2011,(Mar. 27, 2011), 4 pages.
Sadeh, Norman et al., "Understanding and Capturing People's Privacy Policies in a People Finder Application", Personal and Ubiputous Computing vol. 13 Issue 6, Aug. 2009, retrieved from <http://www.casos.cs.cmu.edu/publications/papers/2009UnderstandingCapturingPeoples.pdf> on Dec. 9, 2011, (Aug. 2009),13 pages.
U.S. Appl. No. 13/726,097, Response to Restriction Requirement dated May 12, 2014, 9 pages.
U.S. Appl. No. 13/726,097, Preliminary Amendment dated Nov. 26, 2013, 9 pages.
U.S. Appl. No. 13/726,027, Amendment dated Sep. 9, 2014, 14 pages.
U.S. Appl. No. 13/726,027, Response to Final Office Action dated Apr. 6, 2015, 15 pages.
U.S. Appl. No. 13/726,027, Preliminary Amendment dated Dec. 18, 2013, 8 pages.
U.S. Appl. No. 13/726,092, Amendment dated May 26, 2015, 20 pages.
U.S. Appl. No. 13/726,092, Notice of Allowance dated Oct. 8, 2015, 7 pages.
U.S. Appl. No. 13/726,099, Amendment dated Jun. 24, 2014, 10 pages.
U.S. Appl. No. 13/726,099, Amendment dated Dec. 19, 2014, 13 pages.
U.S. Appl. No. 13/726,099, Amendment dated Mar. 23, 2015, 11 pages.
U.S. Appl. No. 13/726,099, Amendment dated Sep. 8, 2015, 9 pages.
U.S. Appl. No. 13/726,099, Notice of Allowance dated Sep. 17, 2015, 9 pages.
U.S. Appl. No. 13/726,099, Amendment dated Aug. 3, 2015, 13 pages.
U.S. Appl. No. 14/868,300, Amendment dated Jul. 13, 2015, 9 pages.
U.S. Appl. No. 14/868,300, Amendment dated Oct. 27, 2015, 10 pages.

(56) References Cited

OTHER PUBLICATIONS

U.S. Appl. No. 13/726,040, Preliminary Amendment dated Nov. 26, 2013, 7 pages.
U.S. Appl. No. 13/726,040, Amendment dated Apr. 28, 2015, 18 pages.
U.S. Appl. No. 13/726,040, Amendment dated Aug. 27, 2015, 15 pages.
U.S. Appl. No. 13/726,040, Office Action mailed Aug. 25, 2015, 16 pages.
U.S. Appl. No. 13/726,031, Amendment dated Nov. 25, 2015, 12 pages.
U.S. Appl. No. 13/726,027, Amendment dated Dec. 14, 2015, 11 pages.
U.S. Appl. No. 13/726,092, Notice of Allowance dated Dec. 18, 2015, 5 pages.
U.S. Appl. No. 13/726,099, Summary of Examiner Interview, Dec. 17, 2015, 5 pages.
U.S. Appl. No. 13/726,099, Notice of Allowance dated Dec. 31, 2015, 5 pages.
U.S. Appl. No. 14/686,300, Office Action dated Nov. 30, 2015, 11 pages.
U.S. Appl. No. 13/726,090, Final Office Action dated Dec. 15, 2015, 34 pages.
U.S. Appl. No. 13/726,040, Final Office Action dated Dec. 1, 2015, 18 pages.
U.S. Appl. No. 13/726,043, Amendment dated Jan. 6, 2016, 13 pages.
U.S. Appl. No. 13/726,040, Amendment dated Feb. 1, 2016, 9 pages.
U.S. Appl. No. 13/726,049, Final Office Action dated Feb. 1, 2016, 15 pages.
U.S. Appl. No. 14/495,418, Notice of Allowance dated Feb. 5, 2016, 7 pages.
Final Office Action, U.S. Appl. No. 12/897,586, May 22, 2013, 4 pages.
Final Office Action, U.S. Appl. No. 14/686,300, Jul. 29, 2015, 13 pages.
Foreign Office Action, CL Application No. 201300886, May 13, 2015, 7 pages.
Foreign Office Action, CN Application 201110317851.5, May 20, 2015, 8 pages.
Foreign Office Action, EP Application No. 12859600.4, Jun. 1, 2015, 8 Pages.
Foreign Office Action, EP Application No. 12860373.5, Jul. 7, 2015, 6 pages.
Foreign Office Action, JP Application No. 2013-532806, Jun. 10, 2015, 11 pages.
Non-Final Office Action, U.S. Appl. No. 12/897,586, Oct. 18, 2012, 12 pages.
Non-Final Office Action, U.S. Appl. No. 13/726,049, Jul. 7, 2015, 14 pages.
Non-Final Office Action, U.S. Appl. No. 13/726,090, Jun. 23, 2015, 31 pages.
Non-Final Office Action, U.S. Appl. No. 14/495,418, Jul. 2, 2015, 18 pages.
Non-Final Office Action, U.S. Appl. No. 14/686,300, Jun. 8, 2015, 11 pages.
Supplementary European Search Report, EP Application No. 12860373.5, Jun. 25, 2015, 3 pages.
OS-5, "http://en.wikipedia.org/wiki/IOS_5," release date Oct. 12, 2011, 6 pages.
U.S. Appl. No. 13/726,027, Final Office Action dated Apr. 14, 2016, 21 pages.
U.S. Appl. No. 13/726,031, Final Office Action dated Mar. 24, 2016, 20 pages.
U.S. Appl. No. 13/726,040, Notice of Allowance dated Feb. 18, 2016, 5 pages.
U.S. Appl. No. 13/726,049, Amendment with RCE dated Apr. 28, 2016, 11 pages.
U.S. Appl. No. 13/726,099, Petition for Withdrawal From Issue dated Mar. 24, 2016, 9 pages.
U.S. Appl. No. 14/686,300, Final Office Action dated Apr. 8, 2016, 16 pages.
U.S. Appl. No. 14/686,300, Amendment dated Feb. 29, 2016, 11 pages.

\* cited by examiner

MOBILE DEVICES CONTROL

RELATED APPLICATIONS

This application claims priority to U.S. Provisional Application Ser. No. 61/580,131 filed Dec. 23, 2011 entitled "Mobile Device Safe Driving", and also claims priority to U.S. Provisional Application Ser. No. 61/580,137 filed Dec. 23, 2011 entitled "Mobile Device Parental Control", the disclosure of each of which is incorporated by reference herein in entirety.

BACKGROUND

Computing, communication, and entertainment devices, such as mobile phones, portable computers, tablet devices, and the like increasingly offer more functions, applications, and features which can make it difficult and/or inefficient for a user to discover, navigate, and utilize. For example, not only can a mobile phone be used for text, email, and voice communications, but may also be used for entertainment, such as to listen to music, surf the Internet, watch video content, gaming, and for photo and video imaging. Similarly, a portable tablet device may be utilized for email, browser, navigation, and other computing applications, as well as for the various entertainment and photo features. In addition to the many computing, communication, and entertainment applications that are available to a user of a mobile phone or tablet device, a seemingly unlimited number of third-party applications and features are also available for download to a device.

Many of the functions, applications, and features of the various computing, communication, and entertainment devices are beneficial to a user, and can enhance one's personal time as well as work and social activities. For example, children can let their parents know by text message or with a phone call from a mobile phone their whereabouts or that they have safely arrived at a particular destination. However, an increasing problem with these always-connected mobile devices is distracted driving. Many drivers, and particularly teenage drivers, are tempted to send a quick text, make a call, or check a voice message while driving, which may lead to an accident. Accordingly, the functionality made accessible by the mobile devices may be outweighed by the dangers of the devices in certain situations.

SUMMARY

This Summary introduces simplified concepts of mobile devices control, and the concepts are further described below in the Detailed Description and/or shown in the Figures. This Summary should not be considered to describe essential features of the claimed subject matter, nor used to determine or limit the scope of the claimed subject matter.

In embodiments, a mobile device includes a communication interface for control communication with associated devices of the mobile device, and the associated devices correspond to members of a private interaction hub. A device control service is implemented to determine that the mobile device is moving in a vehicle based on motion data, and can generate a device quiet control to restrict at least audible outputs from one or more of the associated devices that are in the vehicle with the mobile device. The device control service can then initiate communication of the device quiet control to the associated devices in the vehicle to quiet the associated devices that are controllable from the mobile device. In addition to restricting the audible outputs from the associated devices, the device control service can generate the device quiet control to restrict communication functions of the associated devices that are in the vehicle with the mobile device.

In embodiments, the mobile device includes an integrated display device to display a device control user interface, and a device quiet input can be received via the device control user interface to initiate the device quiet control for the associated devices. The device quiet input may be received as a user input to the mobile device, or as an automated input, such as when detected audio in the vehicle is determined to be a driver distraction. The mobile device may also include an audio sensor to detect audio in the vehicle, and the device control service can then generate a safe driving notification, such as for display on the integrated display device, to indicate that the audio in the vehicle is a driver distraction. A distracted driving notification can also be generated and communicated to the associated devices that are in the vehicle with the mobile device, where the safe driving notification is generated for display at the associated devices to indicate that use of an associated device is restricted in a safe driving mode.

In embodiments, a device control system includes a network service (e.g., a network of one or more server devices) that executes computer instructions as a device control service. The device control service is implemented to receive a device distraction input from a mobile device that is moving in a vehicle, and generate a device quiet control to restrict at least audible outputs from associated devices that are in the vehicle with the mobile device. The device control service can determine associated devices that correspond to members of a private interaction hub, and that are controllable by the mobile device, based on identifiers of the mobile device and the associated devices. A device quiet control can then be communicated to the associated devices to quiet the devices that are in the vehicle with the mobile device.

The device control service can also generate the device quiet control for a designated time duration and/or to restrict communication functions of the associated devices that are in the vehicle with the mobile device. Additionally, the device distraction input that is received from the mobile device may include an indication that audio in the vehicle is a driver distraction. The device control service can then generate a distracted driving notification to indicate that the audio in the vehicle is a driver distraction, and the distracted driving notification is communicated to the associated devices that are in the vehicle with the mobile device, such as for display to indicate that use of an associated device is restricted in a safe driving mode.

BRIEF DESCRIPTION OF THE DRAWINGS

Embodiments of mobile devices control are described with reference to the following Figures. The same numbers may be used throughout to reference like features and components that are shown in the Figures.

DETAILED DESCRIPTION

Device control service techniques are described. Distracted driving has become an ever increasing problem due to the prevalence of mobile devices. Many drivers, and particularly teenage drivers, for instance, are tempted to send a quick text, make a call, or check a voice message while driving, which may lead to an accident.

Techniques are described herein that may leverage use of a device control service to control access to content and other functionality of one client device by another client device. An example of this is a device quiet zone, device quiet control, safe driving notifications, and so on that may encourage safe driving on the part of a user of the device. A variety of other examples are also contemplated as further described in relation to the following sections.

While features and concepts of mobile devices control can be implemented in any number of different devices, systems, networks, environments, and/or configurations, embodiments of mobile devices control are described in the context of the following example devices, systems, and methods.

Example Environment

Figure 1:
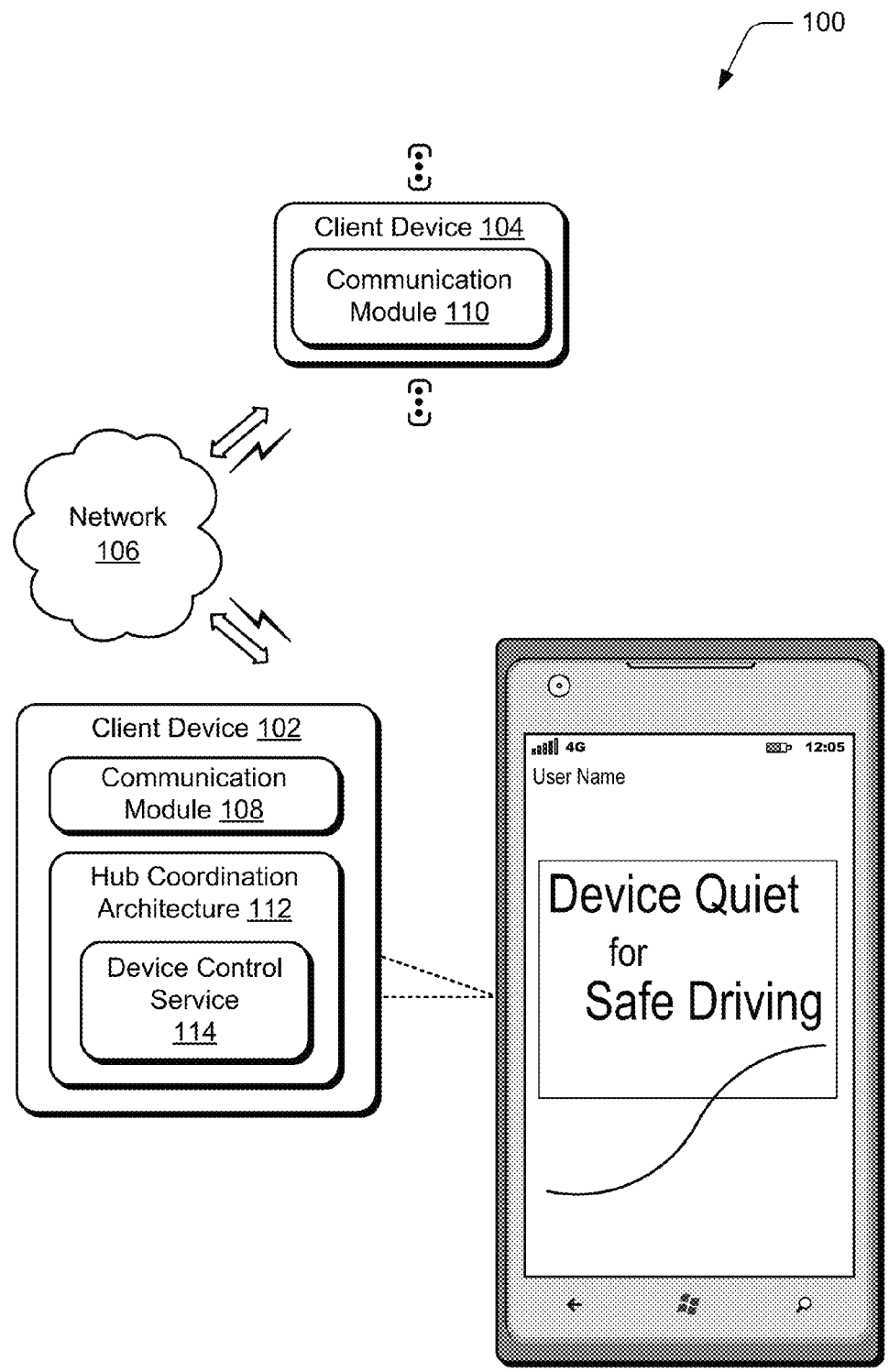
FIG. 1 illustrates an example environment in which various embodiments of mobile device control can be implemented.

FIG. 1 illustrates an example environment 100 in which various embodiments of mobile device control can be implemented. The example system includes a client device 102 communicatively coupled to another client device 104 via a network. The client devices 102, 104 may be configured according to a variety of different computing device configurations. In the illustrated example, the client device 102 is configured as a mobile device, such as a mobile phone 104 although other mobile device configurations are also contemplated, such as a tablet device, communication device, convertible device, entertainment, gaming, navigation, and/or other type of portable electronic device. The client devices 102, 104 may also assume a variety of other computing device configurations, such as traditional PCs, laptops, and so on. Although a single instance of the client device 104 is illustrated, this device may be representative of a plurality of different devices and thus reference in the following discussion may be made to client device 104 in single or in plural form. Additional examples of functionality that may be incorporated as part of the client device 102, 104 may be found later in the discussion.

The client devices 102, 104 are illustrated as including respective communication modules 108, 110. The communication modules 108, 110 are representative of functionality of the devices to communicate via the network 106, such as to communicate with each other. The communication modules 108, 110 may perform this communication using a variety of techniques, such as to support voice communication, text messaging (e.g., SMS, MMS), instant messaging, communication via a social network service, email, near-field communication (NFC) and so on. Accordingly, the client devices 102, 104 may utilize a variety of different techniques to communicate with each other.

The client device 102 is also illustrated as supporting a hub coordination architecture 112. The hub coordination architecture 112 is representative of functionality to provide a hub that supports communication between members of the hub to share data. The hub, for instance, may include a user interface via which users of the client device 102, 104 may share content based on membership to the hub. Accordingly, the membership may act to support permissions on content between the users of the hub based on membership to the hub. A variety of different content may be shared via the hub, such as messaging, photos, links, background image of the hub, videos, and so on.

Designated member relationships can be utilized to define how the data and information is managed in relation to the hub, and can be implemented to leverage the social contract embodied in the hub. In embodiments, the hub is implemented by the hub coordination architecture 112 as a user interface and/or a client device application for integration and aggregation of the hub-orientated communications, activities, and information. A hub can be implemented as a private, shared space that is limited to access by defined members of the hub. The hub, for instance, may contain links to other members' profiles, and based on restriction settings, allows aggregation for visibility of some of other members' data and information within the hub, and so on. The hub may also be configured to share a group calendar which can be viewed and edited, a common text message window, a posting board, a shared photo album, a check-in feature, and any other type of shared information as further described as follows and show in relation to FIG. 2.

An example of this functionality is illustrated in FIG. 1 as a device control service 114. The device control service is representative of functionality of client device 102 to control access to content and other functionality of one client device by another client device. An example of this is a device quiet zone, device quiet control, safe driving notifications, and so on. A variety of other examples are also contemplated as further described in relation to the following sections.

Figure 2:
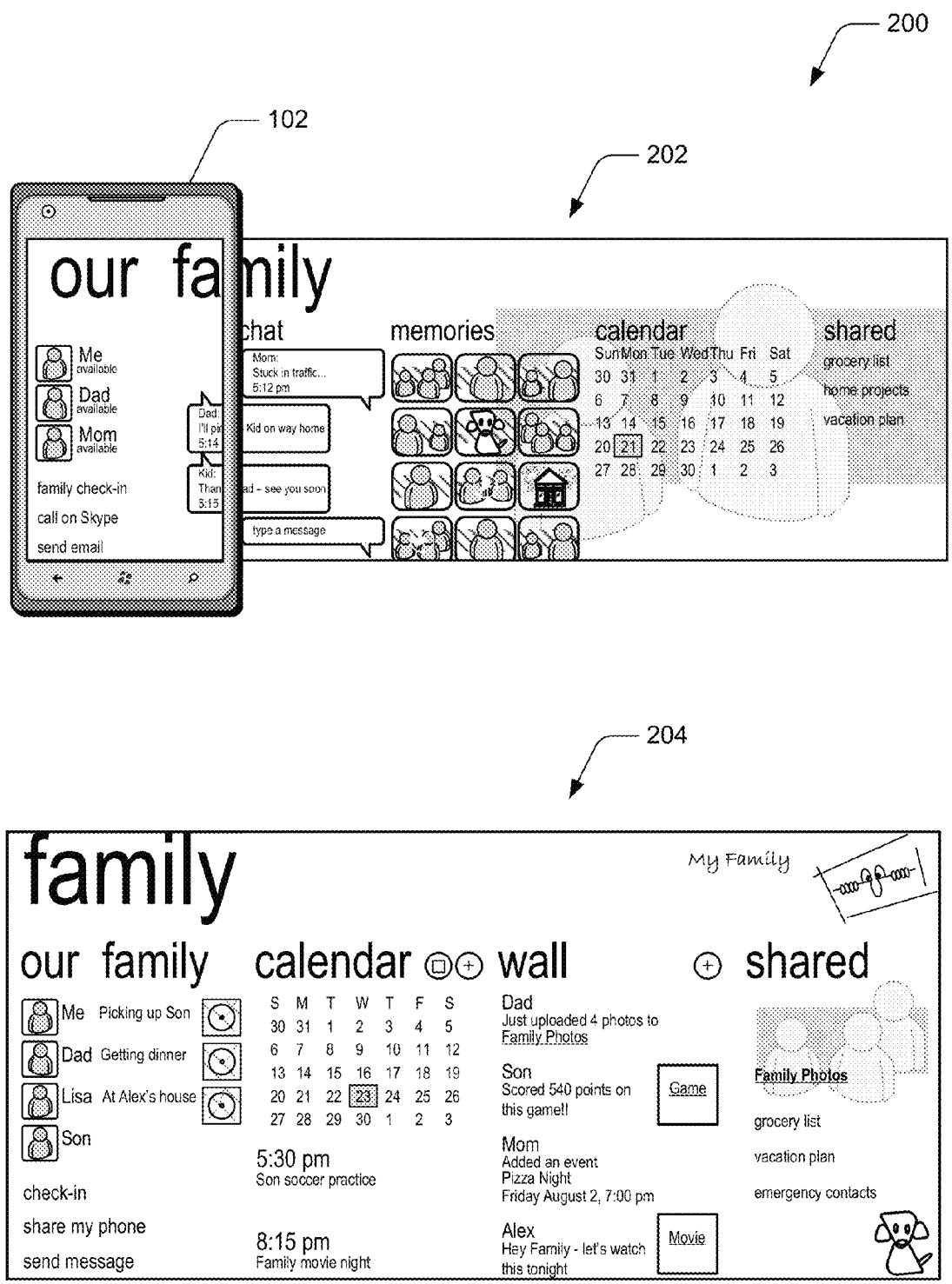
FIG. 2 is an example of a system showing two different examples of hubs for a family.

FIG. 2 is an example of a system 200 showing two different examples of hub user interfaces for a family-orientated hub. The description, layout, orientation, features, and organization of the text, images, photos, graphics, links, data, information, and presentation features shown with reference to the hub user interfaces, as well as with reference to any other user interfaces described herein and/or shown in the figures, are merely examples that may be altered in any aspect for various embodiments and/or implementations of mobile device control.

The hub is a central space for membership-orientated coordination of communications, activities, information, and integration. Designated member relationships can be utilized to define how the data and information is managed, and can be implemented to leverage the social contract, such as between members of a defined familial group in the illustrated example. In one or more implementations, the hub is implemented as a user interface (e.g., via a client device application) for integration and aggregation of the membership-orientated communications, activities, and information. A hub can be implemented as a private, shared space between defined members. The hub contains links to other members' profiles, and based on restriction settings, allows aggregation for visibility of some of other members' data and information within the hub. The hub may share a group calendar which can be viewed and edited, a common text message window, a posting board, a shared photo album, a check-in feature, and any other type of shared information.

Devices and/or device accounts can be associated within a set of devices or device accounts (e.g., a family phone account, user accounts, a connected set of devices, and so on), and all or a subset of the devices or accounts can communicate with other devices or accounts. The members of a hub can be defined by any number of different classes of people, such as Junior, Teen, Mom, Dad, (or Parent), Grandparent, Nanny, Life-Coach, and so on for the illustrated example of a family. Further, the members of a family can be defined to distinguish a live-in Nanny from a Babysitter, for example.

Additionally, membership of the hub as well as use of the hub by the members can be controlled by a select collection of users, such as one or two mobile phones by the associated users of the client devices. For example, one of the members in the hub can be the designated control person, such as a Mom who runs the household, an employer, and so on.

From a single configuration of the members, the hub can be provisioned, setup, and propagated out, e.g., automatically. The features and configuration of a hub may default to an automatic, easy setup, but any rule, feature, or configuration aspect can be readily modified by a user. Provisioning a hub may be based on billing, e.g., a family billing plan. However, if a phone device is changed to a different carrier, for example, the phone device can still receive texts related to the hub. Alternatively or in addition, provisioning a hub can be based on email addresses, phone numbers, user account identifiers, or any other identifier.

A retail person selling a new phone package, for instance, can easily identify the members each to their new phone devices and initiate the hub being instantiated. From a consumer perspective, it just works and members can walk out of the store all set up. All of the data and information can be shared with a single selection, and thus the members do not have to share each item (e.g., a grocery list, photos, calendar, etc.) individually and separately.

The hub user interface may act as a shared space that is customizable and provides for user-generated and shared content. Some information can be shared, while other information is not. For example, Mom's complete Christmas list is not viewable by the other family members, but Dad and Kids can add to the list (and only view their contribution). Hub setup may be performed "a la carte," meaning only the features that members want displayed on the hub wall can be selected. For example, Mom wants to see the shopping list, whereas Dad does not shop and so wants to avoid having the list displayed on his device, yet he could still access the shopping list to add items when desired.

The hub user interface integrates functions, calendar functionality, event and/or data summaries (i.e., on the "wall"), as well as content that is shared between the members of the hub (e.g., lists, documents, etc.). For example, the hub user interface may include a "family check-in" or "check-in" option. The hub user interface may also include a chat section where location check-ins messaged are displayed along with other messages interchanged between the members of the hub. The hub "wall" is representative of an area via which members of the group may add to as desired, like a lunchroom bulletin board, family refrigerator, and so on. In implementations, the information can be aggregated in pillars or columns and shown on the hub wall as illustrated. The hub wall can also represent an interrelation between any of the information and data that appears on the wall and its placement in time. The hub settings provide that a user can control which functions are integrated and displayed within the hub, such as on the wall.

The hub information may also be context relevant to the members of the hub, and the calendar includes shared hub events. Calendar updates can be posted as notice events on the wall, and a user can look at the wall to see upcoming hub events, or the events that pertain to one or more other members of the hub. Messaging may also be performed that is private among the members of the hub. A member can instant text (or other communication) to all other members in the hub. Texting—such as for a work meeting—can divide each members' display on their respective devices into individual screens for each member.

The hub may also be extensible, and may link to a hard drive on a home computer, or sync to just one of the other devices, the manager, or cloud control (e.g., from a network-based service). The hub may also be extensible to third parties that add a note on the hub wall, such as implemented with application program interfaces (APIs) for functions to post data to the hub. A third-party application, however, would not have access to the context of the hub wall, such as to obtain or display hub data. In certain embodiments, the private information and hub data could be encrypted and only decrypted by the phone devices that are associated with the hub.

Thus, the hub supported by the hub coordination architecture 112 may be thought of as a central space for coordination of communications, activities, information, and integration of members of the hub. Hubs may be defined to support a variety of different membership, such as for family members, coworkers, friends, acquaintances, fan clubs, and so forth. Therefore, although examples are discussed that relate to a family in the following discussion it should be readily apparent that membership in the hub may be defined in a variety of other ways without departing from the spirit and scope thereof. Accordingly, the hub coordination architecture 112 may be used to support a variety of different functionality. An example of this functionality is illustrated as a device control service 114 as further described below and shown in relation to the corresponding figure. Further aspects of hubs are also described further herein.

Parent Dashboard

A parent dashboard is a privately shared space that has limited accessibility by one or more family members of a family group to view and control family-orientated information and family members' mobile device functions, features, and settings. The parent dashboard can display a visual summary of an individual family member's information, such as, phone usage, history, restrictions, settings, and the like. Furthermore, the parent dashboard allows a family control member to set restrictions, grant accesses, and allocate information to the other family members in a family group.

In embodiments, the parent dashboard is implemented as a user interface and/or a client device application. Embodiments of a parent dashboard include any one or combination of implementation features, such as described in the following paragraphs. Devices and/or device accounts can be associated within a set of devices or device accounts (e.g., a family phone account, live accounts, a connected set of devices, etc.), and all or a subset of the devices or accounts can communicate with other devices or accounts.

Figure 3:
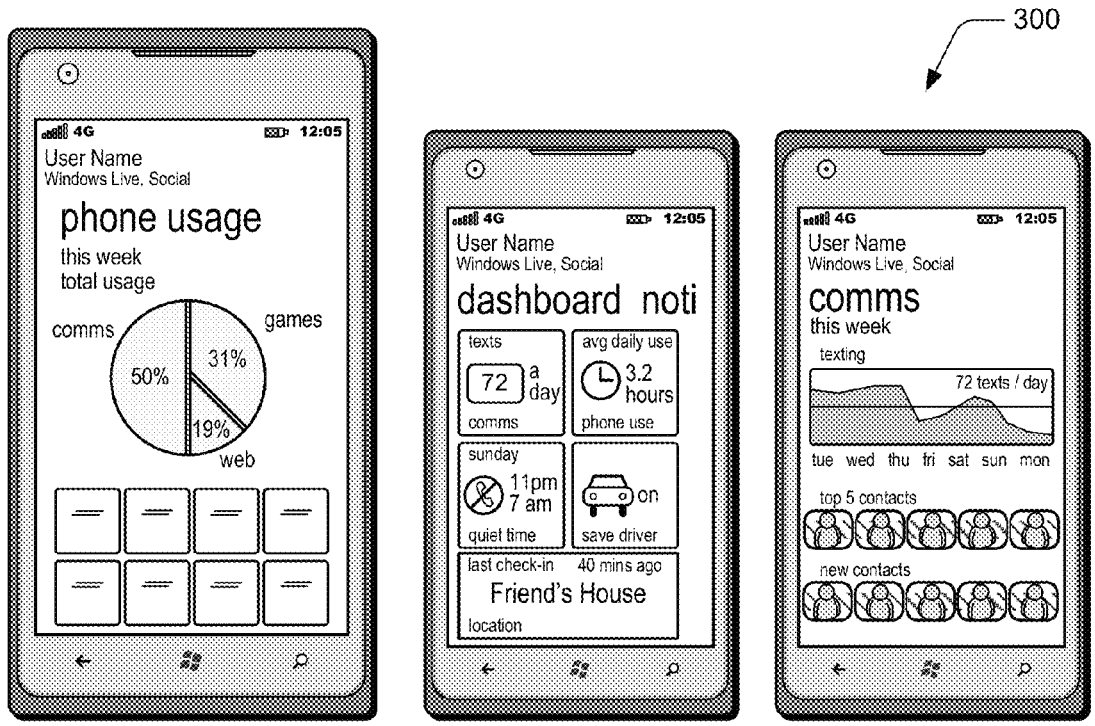
FIG. 3 illustrates example user interfaces of a parent dashboard of a parent control service of FIG. 1.

FIG. 3 illustrates example user interfaces 300 of parent dashboard. A hub control member (such as a family control member) can review the parent dashboard on a mobile phone or other mobile device to learn how other family members are using their respective mobile devices. A representation of a hub member can be selected to initiate an overall display of the member's device usage information, such as a number of texts communicated and received, who the member is communicating with, new contacts that may have been established, etc. The parent dashboard can also show the Internet sites a hub member has visited, the videos that have been displayed for viewing on the member's phone, music and/or games that have been downloaded, a purchase that has a parental advisory warning, etc. In an implementation, the top five (or top X) applications, videos, games, etc. may be displayed on the parent dashboard.

The parent dashboard can also be implemented to display the last changes and/or setting adjustments to the dashboard itself, so that for example, if a kid changes the parent dashboard on a hub member's phone device, the parent will be able to detect the changed settings. The parent dashboard may be implemented for viewing with an additional level of security on the authoritative, parent's phone device, such as by biometric detection or by entering a different access code used to restrict or lockout access to the parent dashboard.

The parent dashboard can include any type of settings and control selections that are user-selectable or voice activated. A parent or other controlling entity can enforce the amount of television time, gaming time, and general device usage on all connected devices in the household that are utilized by hub members. The parent dashboard, for instance, can also be utilized to determine new contacts of a child or kid family member that has a mobile device and/or to monitor texts for identifiable language.

Quiet Time

A quiet time feature can be implemented by a control user to set usage and/or function restrictions on other phone devices, such as other family members' devices in a family group. The usage and/or function restrictions can be implemented for time-specific periods and/or based on the geo-location of a family member's phone or other mobile device. The quiet zone features can be implemented as a user interface and/or client device application or service. Embodiments of quiet time include any one or combination of implementation features, such as described in the following paragraphs. Devices and/or device accounts can be associated within a set of devices or device accounts (e.g., a family phone account, live accounts, a connected set of devices, etc.), and all or a subset of the devices or accounts can communicate with other devices or accounts.

The quiet time settings for the hours and/or days in effect on a per-user basis can be enabled and/or disabled via a user interface that includes time and day setting options common in scheduling features, such as for reminders and meetings. The quiet time settings also allow a user to define what aspects of a device are disabled when quiet time is enabled, such as when doing anything, playing games, communicating, etc. A device that has quiet time enabled can display an indicator that quiet time is enabled, such as an icon next to the current time and day, or a display message that indicates quiet time is active (e.g., displaying an icon or message "Quiet Time" on the device's home screen or lock screen).

Figure 4:
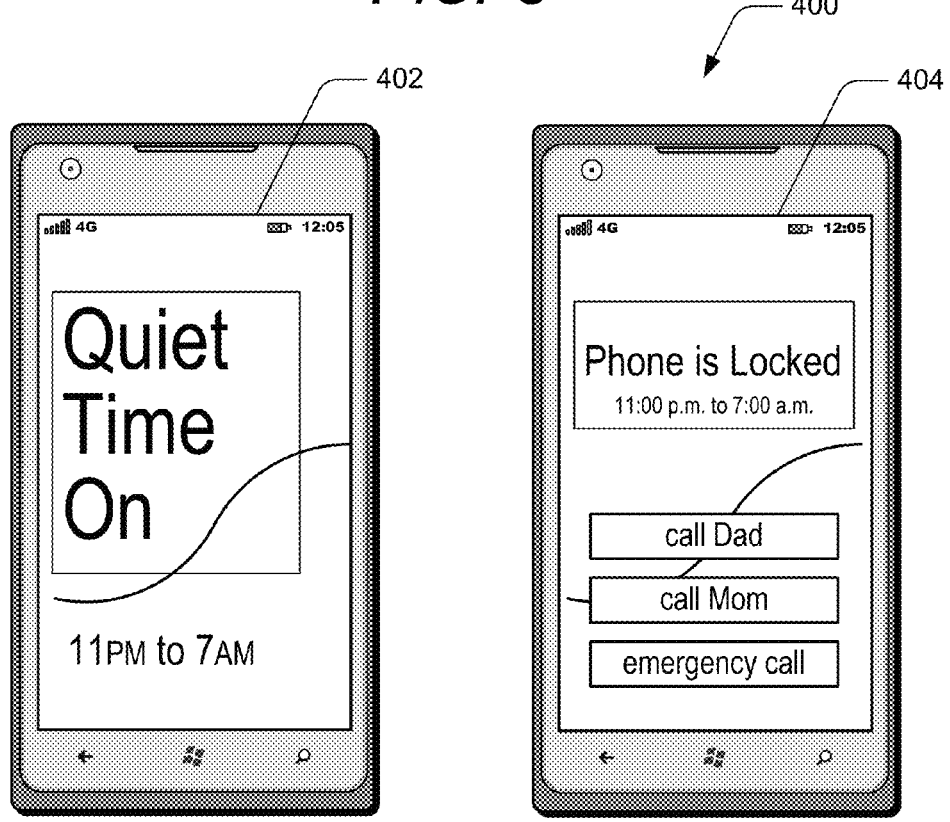
FIG. 4 illustrates examples of quiet time user interfaces when quiet time is active on a device of a device quiet service of FIG. 1, such as a lock screen displayed on a mobile phone to indicate the duration for quiet time.

FIG. 4 illustrates examples 400 of quiet time user interfaces when quiet time is active on a device, such as a lock screen 402 displayed on a mobile phone to indicate the duration for quiet time (e.g., displayed text "11 PM to 7 AM"). Another lock screen 404 is an example of a display that indicates the phone is locked, but capable of enabling critical functionality like emergency calls or communicating with parents or the individual who setup the quiet time period. In this manner, the user of the device can still perform critical functions or negotiate with the parent or guardian to disable the quiet time setting.

Quiet time provides parental controls of friends, family, and kids that have mobile phones or other mobile computing devices on a person's phone bill account. The person responsible for paying the bill can receive notice when friends and family exceed text and data rates, and a parent can disable a child's phone directly from the parent's phone. With remote parental controls, a parent can initiate a phone curfew or timeout. Rules can be applied for mobile phone plans for data, text, and voice limits to automatically shut down the phone. There may be exceptions for emergency calls and messaging.

Quiet time may be time and/or location dependent. A mobile device may also begin to learn and infer the regular schedule of a user, such as when a kid is in class at school and then out of school. This may tie in with a family hub calendar to initiate various quiet time modes and settings. Quiet time implements restricted functionality, rather than control of the quieted device. This may be implemented as a group quiet function, such as during dinner and all family member devices are quieted. Quiet time may also be implemented as a one-button shut-down selection, such as for church, in a movie, or to limit just gaming, and so on. Quiet time may be implemented at a business or location, such as at a church, movie theater, or coffee shop, and patron's phone devices are quieted. Quiet time may be disabled so that a quieted device is reactivated by bumping (for example, by using NFC) the quieted device with the parent control device from which the quiet time was activated.

Quiet Zone

Similar to the quiet time feature, a quiet zone feature can be implemented by a control user to quiet other phone devices, such as other hub members' devices in a hub, based on location, time, event, and/or the dynamic status of the membership of the hub. The quiet zone restrictions can be implemented for time-specific periods and/or based on the geo-location of a member's phone or other mobile device. The quiet zone features can be implemented as a user interface and/or client device application or service. Embodiments of quiet zone can include any of the implementation features describe with reference to the quiet time features. Additionally, implementations of quiet zone may be initiated inside a car with hub members so as not distract the driver with noise, music, and other sounds from the other members' devices.

Safe Driving

Safe driving features reduce and/or eliminate the distractions associated with a mobile device while driving. A mobile device, such as a mobile phone, can be synced with the automobile being driven, and based on geo-location and/or acceleration rates, the mobile phone can be disabled or partially disabled, as well as implemented to interface with the automobile. The safe driving features can be implemented as a user interface and/or client device application or service. In certain embodiments, a safe driving implementation is not an application that can be uninstalled from a mobile device, and may be implemented as part of the operating system of a device. Alternatively, a safe driving application may downloaded to a mobile device as a third-party application. Embodiments of safe driving include any one or combination of implementation features, such as described in the following paragraphs.

A safe driving disabled mode is an example of a safe driving feature that can be implemented for a mobile device when a user is operating a vehicle with a wireless beacon device associated with the vehicle (e.g., a Bluetooth hands-free speaker/microphone device). Mobile device safe driving provides that a restrictive disabled mode can temporarily disable a mobile device when the device is in the presence of both a vehicle wireless beacon device and another mobile device owned by an associated person, such as a parent or a guardian. In this manner, the solution does not present as a failure to the owner of the device. If the device owner is a teenager and Mom is driving, the teenager has normal access to the device capabilities. If the device owner is a teenager and he or she is driving, the safe driving mode can be disabled, but the solution relies on the presence of Mom to reinforce and/or remind the teenager of good driving habits. Safe driving mode implementations can dynamically change behaviors based on who is in the vehicle.

Devices and/or device accounts can be associated within a set of devices or device accounts (e.g., a family phone account, live accounts, a connected set of devices, etc.), and all or a subset of the devices or accounts can communicate with other devices or accounts. Mobile device safe driving can be implemented to restrict access to a phone based on GPS acceleration data, as distinguished from the physical act of driving with car monitors. Safe driving is not tied to a particular vehicle, and can be related to other contextual information that is not registered by car monitors, such as loud music, distracting friends in the car, or other sources of distraction that range from passive to active behaviors. Safe driving information can be used to counter insurance claims of unsafe driving and rate increases, and not just for teenagers, but also senior citizens, drivers with DUI's, etc.

A safe driving mode user interface is implemented from which safe driving mode settings can be enabled and disabled, and there may be many levels of disabling device capabilities. For example, a safe driving mode can render the device completely disabled, or just text messaging is disabled to eliminate texting while driving, but not texting while a passenger in the vehicle. A device in safe driving mode can display an indication that a safe driving mode is enabled, such as an icon next to the current time/day and/or the words "Safe Driving Mode On" on a device home screen or lock screen. Safe driving mode settings can associate one or more vehicles to any user and/or number of devices. The safe driving mode settings can all be set remotely from an authoritative phone device, such as a parent's mobile phone.

Figure 5:
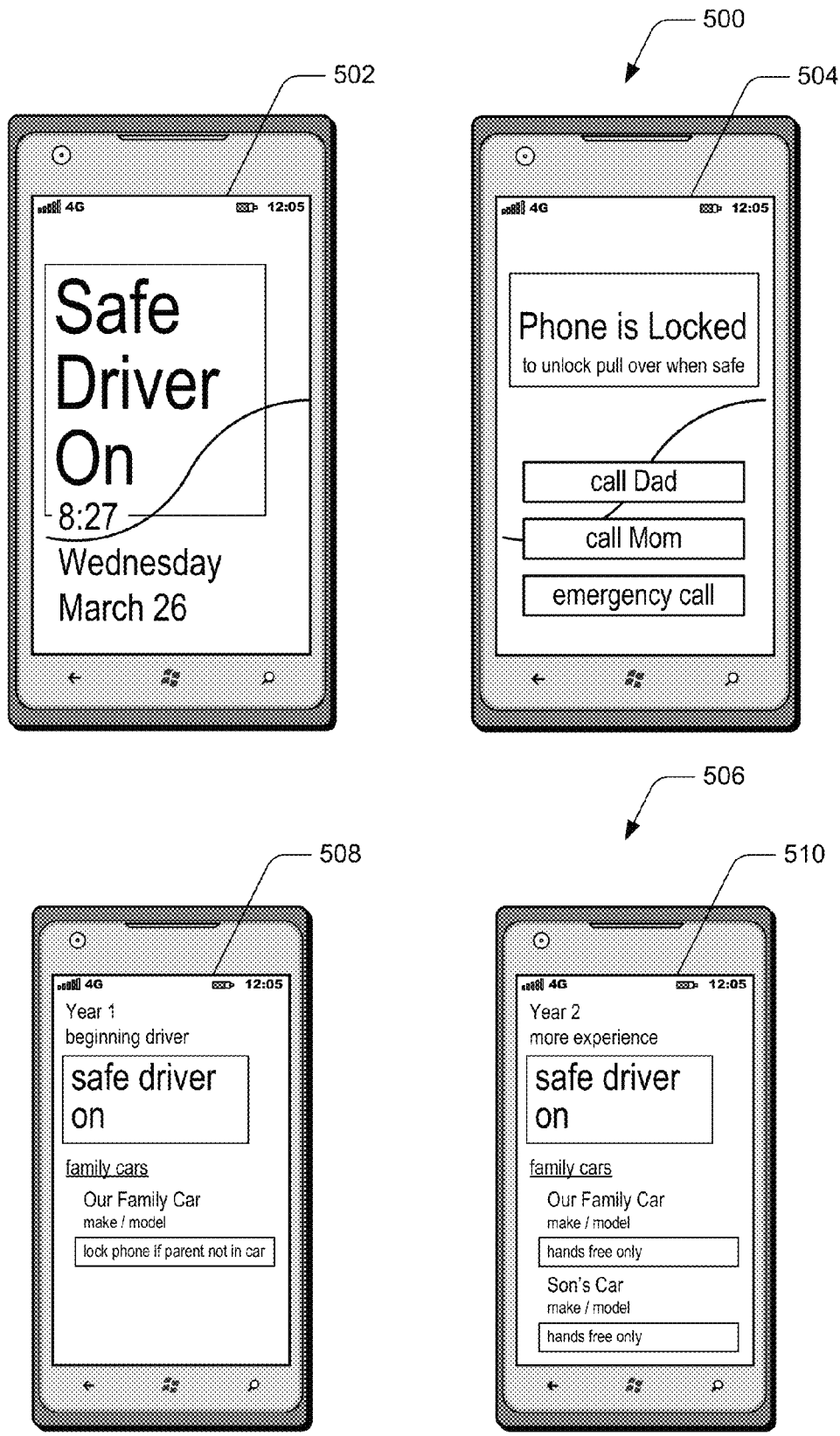
FIG. 5 illustrates example user interfaces of a parent dashboard of a device control service of FIG. 1.

FIG. 5 illustrates examples 500 of safe driving mode user interfaces, such as a lock screen 502 displayed on a mobile phone when the safe driving mode is active in the presence of a vehicle. Another lock screen 504 is an example of a display that indicates the phone is locked, but capable of enabling critical functionality like emergency calls. In an example, safe driving mode settings 506 are illustrated for a teenager in two different years. In the first year 508 of driving, the teen is a new driver and has access only to the family car. In his first year, his parents have used the settings user interface to restrict his usage and lock the phone completely. In the second year 510 of driving, the teen has his own car and his parents have allowed him to move up to hands-free operation with both vehicles.

Embodiments of mobile device safe driving incorporate bi-directional communication with a vehicle, or can be implemented for no communication with the vehicle. Mobile device safe driving can also be implemented to limit vehicle speed so that a teenage driver cannot exceed a designated speed limit, such as in a school zone. Safe driving can also communicate car service reminders to the driver, such as to change the oil, wiper blades, etc. At the time of a crash, the phone device can automatically report its status, send messages, alert emergency services, etc. An emergency may be due to a crash and based on crash impact data, or based on erratic inputs (e.g., due to diabetic, heart attack, blown tire, etc.) and slow the car and send a text message. An emergency and/or situation may also be based on a vehicle breakdown when the vehicle is pulled over to the side of the road at a detected location that would not typically be a stopping location.

Safe driving features and modes can be implemented for different levels of permissions for family members, to loan a car to a friend, for valet monitoring, etc. The vehicle that is associated with a mobile phone and user can communicate independently of the device, such as indirectly through a cloud-based service to communicate safe driving mode notifications to a parent and/or family members. A safe driving mode notification may alert a driver that he or she is going to be late for an appointment based on the current route of travel and destination. A message can then be generated to inform the driver to re-route, edit an errand list, update GPS, etc. For example, a driver may be on a list of errands for Mom with mom's car. When mom cancels one of the errands from the shared calendar, GPS informs the Kid driver to skip the next errand stop.

Safe driving features and mode implementations can also be utilized to manage a fleet of any type vehicles. As a driver approaches a vehicle, the driver's phone is identified to the vehicle and can be paired with the vehicle, such as via Bluetooth, WiFi, or other addressable device. This may be integrated with a key fob location proximate the ignition switch in a vehicle and/or setup for different profiles based on the vehicle and phone to checkout a vehicle.

In a safe driving mode, a kid's phone can become a communication channel that a parent can open with his or her phone, such as to activate the kid's phone to record video and/or audio at its current location. This may also be auto-activated, such as when the kid's phone is in another car that has been detected driving erratically or at excessive speed to send a safe driving mode notification to the parent's phone device. Safe driving features and modes are not limited to the control of a parent over a teenage driver. Any person that wants to drive safer can initiate the safe driving features and modes on his or her device. For example, a rental car company can discount a driver if the driver implements safe driving mode while driving a rented car.

Safe driving features and modes can also provide warnings, messages, and notifications when driving in other countries or regions (e.g., regional or country specific safe driving), such as notifications of different road rules when driving in different countries. Safe driving features may also be implemented to recognize road and/or weather conditions, and provide warnings and notifications. Safe driving mode notifications can be filtered and optionally programmed. For events of a certain type, an immediate text message may be generated. Alternatively or in addition, a daily or weekly driving report can be generated and communicated.

Mobile device safe driving can utilize phone device sensors and features, such as to determine if a user is traveling on a train as a passenger, or determine bus pass information. A user passenger status may also be determined from audio and/or camera images used to determine one's space in car, train, or other vehicle. Features may also be implemented to determine media access control (MAC) address ranges to identify proximate conveyances (e.g., not just passing cars).

A safe driving application may be implemented in the vehicle for the bulk of the data processing, and the phone device is then a client device to the vehicle. Save driving features can incorporate a theft deterrent in the vehicle application that identifies only those phone devices that, when proximate or in the vehicle, allow the vehicle to start and be driven. Near field communication (NFC) tags can be implemented in the doors of a vehicle to identify proximate phone devices of associated users in the seats of the vehicle.

Figure 6:
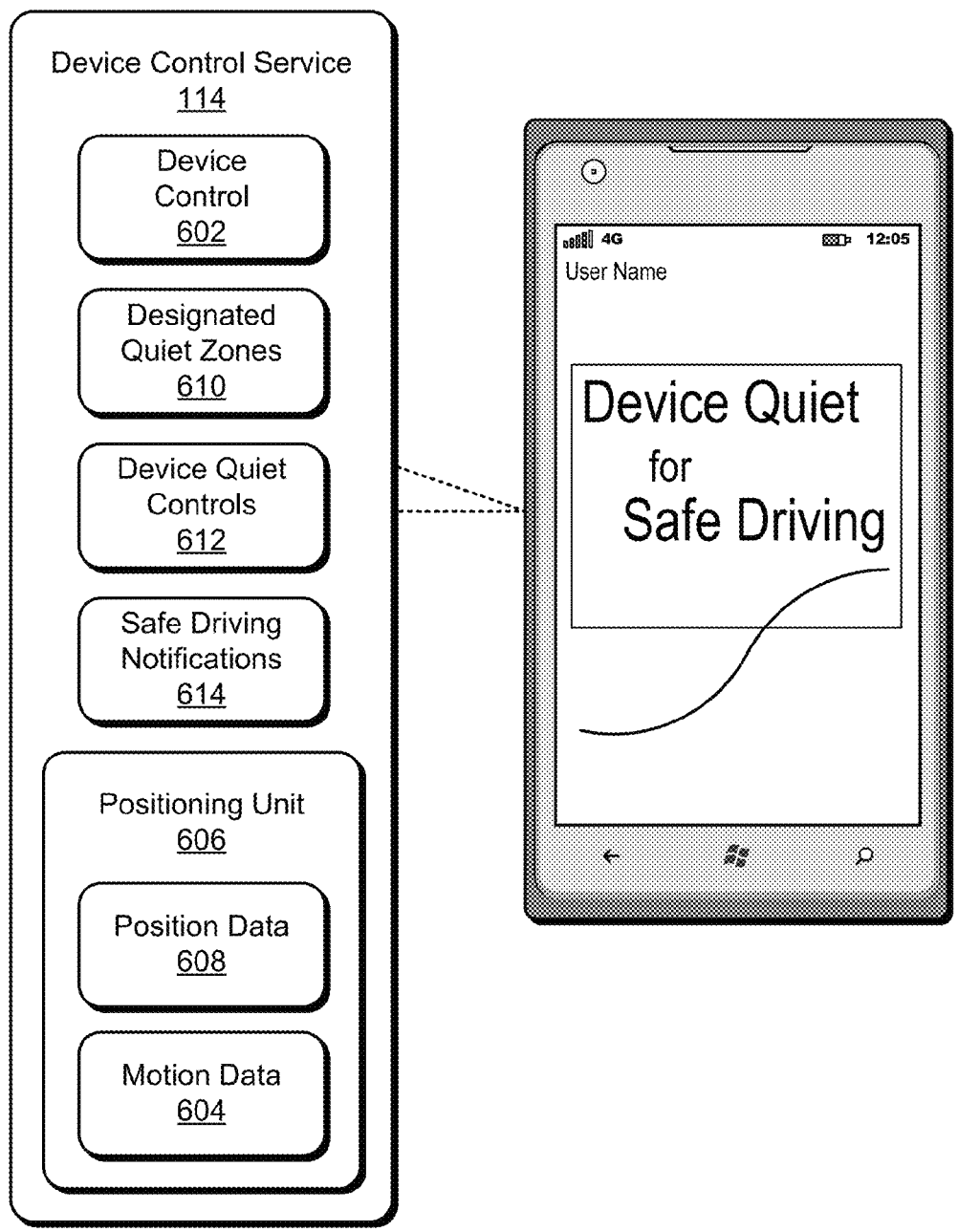
FIG. 6 illustrates an example mobile device in which embodiments of mobile device control can be implemented.

FIG. 6 illustrates an example mobile device in which embodiments of mobile devices control can be implemented. The mobile device is an example of the client device 102 or any of the other devices described previously, and can be implemented as a controlling device or an associated controlled device. The mobile device includes an integrated display device on which a user interface can be displayed. The mobile device includes a device control service 114 and can be implemented with various components, such as a processor and/or memory system, as well as any number and combination of differing components as further described with reference to the example devices shown in FIGS. 10-13. In embodiments, the device control service 114 may be implemented to include the functionality previously described, e.g., device quiet, to support functionality of the device control service 114, e.g., for safe driving.

The mobile device can be a controlling device that controls one or more associated devices, such as mobile phones and devices for the members of a group that are family members of a family, or business members of a business, or are members of some other group to which the members are affiliated. The device control service 114 can initiate device controls 602 to control functions, settings, access, and/or restrictions of associated devices, and can also control communication of group information to the associated devices for the members of the group. For example, a user of the mobile device can initiate a device control, such as via a device control user interface, to control the mobile devices of other family members.

In embodiments, the device control service 114 can determine that the mobile device is moving in a vehicle based on motion data 604. The mobile device includes a positioning unit 606, such as a GPS unit, to determine position data 608 and the motion data 604 that indicates the device is moving, such as in a vehicle. A vehicle may also be a designated quiet zone 610 so that distractions from mobile devices in the vehicle are kept to a minimum. The device control service 114 may be implemented to generate a device quiet control 612 that is communicated to the associated devices that are in the vehicle with the mobile device to restrict audible outputs from the associated devices.

For example, the user of the mobile device may be traveling in a vehicle with other family members that also have their mobile devices. To avoid distracting the driver with the various audible outputs from all of the devices in the vehicle, a device quiet control 612 can be generated by the device control service 114 at the mobile device and communicated to the associated devices to restrict the audible outputs that are likely distracting to the driver of the vehicle. The audible outputs from the devices may include music and/or video playback audio, telephone call rings, keyboard clicks, and any of the many possible alerts, tones, reminders, etc.

A device quiet control 612 can generated and communicated to mute audio outputs of an associated device, change sound settings of the associated device, and/or any other type of software audio control of an associated device. The device control service 114 can also generate a device quiet control 612 for a designated time duration and/or to restrict communication functions of the associated devices that are in the vehicle with the mobile device. The communication functions of the devices can include any one or combination of text messaging, instant messaging, and voice communication functions.

A device control user interface can be displayed on the integrated display device of the mobile device, and the device control service 114 can receive a device quiet input via the device control user interface to initiate a device quiet control for the associated devices. The device quiet input may be received as a user input to the mobile device via the device control user interface, or as an automated input, such as when detected audio in the vehicle is determined to be a driver distraction.

The mobile device can include an audio sensor to detect audio in the vehicle, and the device control service 114 can then generate a safe driving notification 614, such as for display on the integrated display device, to indicate that the audio in the vehicle is a driver distraction. A distracted driving notification can also be generated and communicated to the associated devices that are in the vehicle with the mobile device, where the distracted driving notification is generated for display at the associated devices to indicate that use of a device is restricted in a safe driving mode. For example, the user interface shown displayed on the integrated display device indicates that the mobile device has been quieted for safe driving.

Figure 7:
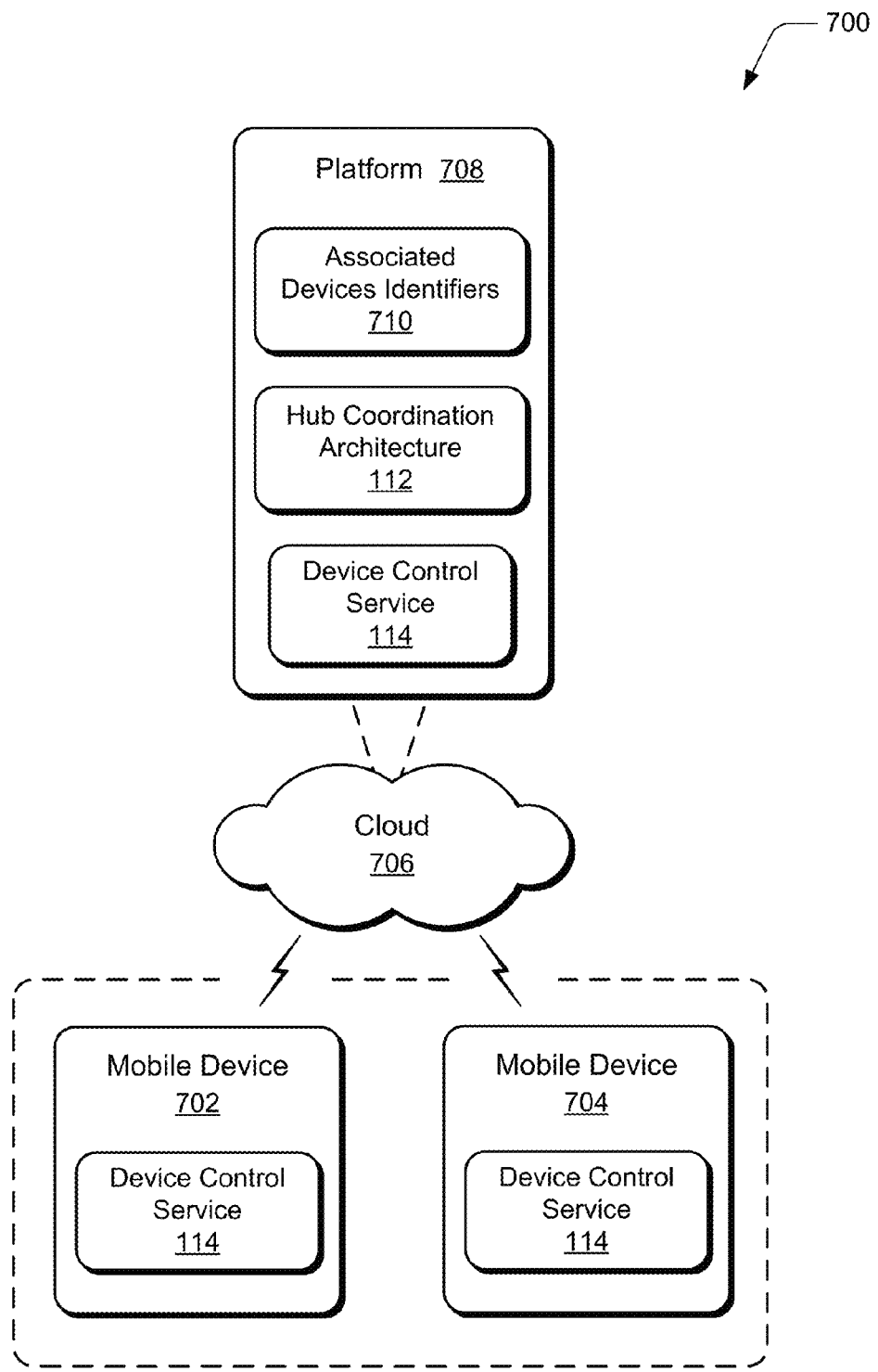
FIG. 7 illustrates an example system that includes mobile devices and that are examples of a client device as described with reference to the previous figures.

FIG. 7 illustrates an example system 700 that includes mobile devices 702 and 704 that are examples of the client device 102, 104 as described with reference to the previous FIGS. 1-6. In embodiments, the mobile devices 702 and 704 can each be associated with a different user, and the users are defined members of the hub as illustrated by the dashed line, which may include two or more associated devices. The mobile devices each include an implementation of the device control service 114 as described with reference to the previous FIG. 1. In the example system 700, multiple devices can be interconnected through a central computing device or system, which may be local to the multiple devices or may be located remotely from the multiple devices. Alternatively, or in addition, the mobile devices 102, 104 may also be peer-to-peer communication mode.

In embodiments, the central computing device may be a cloud 706 of one or more server computers that are connected to the multiple devices through a network, the Internet, or other data communication link. In embodiments, this interconnection architecture enables functionality across multiple devices to provide a networked service environment of the multiple devices. Each of the devices may have different physical configurations and capabilities, and the central computing device can utilize a platform 708 to maintain the associated devices identifiers 114, and implement the hub coordination architecture 112 and/or a device control service 114. In embodiments, the device control service 114 at the platform 708 can implement any of the embodiments and features of mobile devices control as described herein.

The cloud 706 includes and/or is representative of the platform 708 for the networked service components (e.g., the device control service 114) that implements embodiments of mobile devices control. The platform abstracts underlying functionality of hardware, such as server devices, and/or software resources of the cloud. The networked service components may include applications and/or data that can be utilized while computer processing is executed on servers that are remote from the mobile devices 702 and 704.

In embodiments, the device control service 114 at the platform 708 is implemented to receive a device distraction input from a mobile device (e.g., mobile device 702) that is moving in a vehicle. The device control service 114 can also receive motion data from a positioning unit of the mobile device, where the motion data indicates that the mobile device is moving in the vehicle. The device distraction input may include an indication that audio from multiple mobile devices in the vehicle is a driver distraction. The device distraction input can be a user input to the mobile device to initiate a device quiet control for associated devices, such as the other mobile devices in the vehicle. Alternatively or in addition, the device distraction input may be automated from the mobile device based on a determination that the audio from the other mobile devices in the vehicle is a driver distraction.

The device control service 114 at the platform 708 can generate a device quiet control to restrict audible outputs from the associated devices that are in the vehicle with the mobile device. For example, the associated devices are mobile phones and devices that correspond to family members of a private interaction hub, such as family members traveling in a vehicle together. To avoid distracting the driver with the various audible outputs from all of the mobile devices in the vehicle, a device quiet control can be generated by the device control service 910 and communicated to the devices to restrict the audible outputs that are likely distracting to the driver of the vehicle. A device quiet control can generated and communicated to mute audio outputs of an associated device, change sound settings of the associated device, and/or any other type of software audio control of an associated device. The device control service 114 can also generate the device quiet control for a designated time duration and/or to restrict communication functions of the associated devices that are in the vehicle with the mobile device.

The device control service 114 at the platform 708 can determine the associated devices (e.g., the mobile device 704) that are controllable by the mobile device 702 based on the associated devices identifiers 710, and communicate the device quiet control to the associated devices, such as to the mobile device 704 and to any other controllable, associated devices that are in the vehicle with the mobile device 702. The device control service 114 can also generate a distracted driving notification to indicate that the audio in the vehicle is a driver distraction, and the distracted driving notification is communicated to the associated devices that are in the vehicle with the mobile device. The distracted driving notification is communicated for display at the associated devices to indicate that use of an associated device is restricted in a safe driving mode.

Example Procedures

The following discussion describes mobile device parental control techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Example techniques 800 and 900 are described with reference to respective FIGS. 8 and 9 in accordance with one or more embodiments of mobile devices control. Generally, any of the services, functions, techniques, procedures, components, and modules described herein can be implemented using software, firmware, hardware (e.g., fixed logic circuitry), manual processing, or any combination thereof. A software implementation represents program code that performs specified tasks when executed by a computer processor. The example techniques may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The techniques may also be practiced in a distributed computing environment by multiple computer devices. Further, the features described herein are platform-independent and can be implemented on a variety of computing platforms having a variety of processors.

Figure 8:
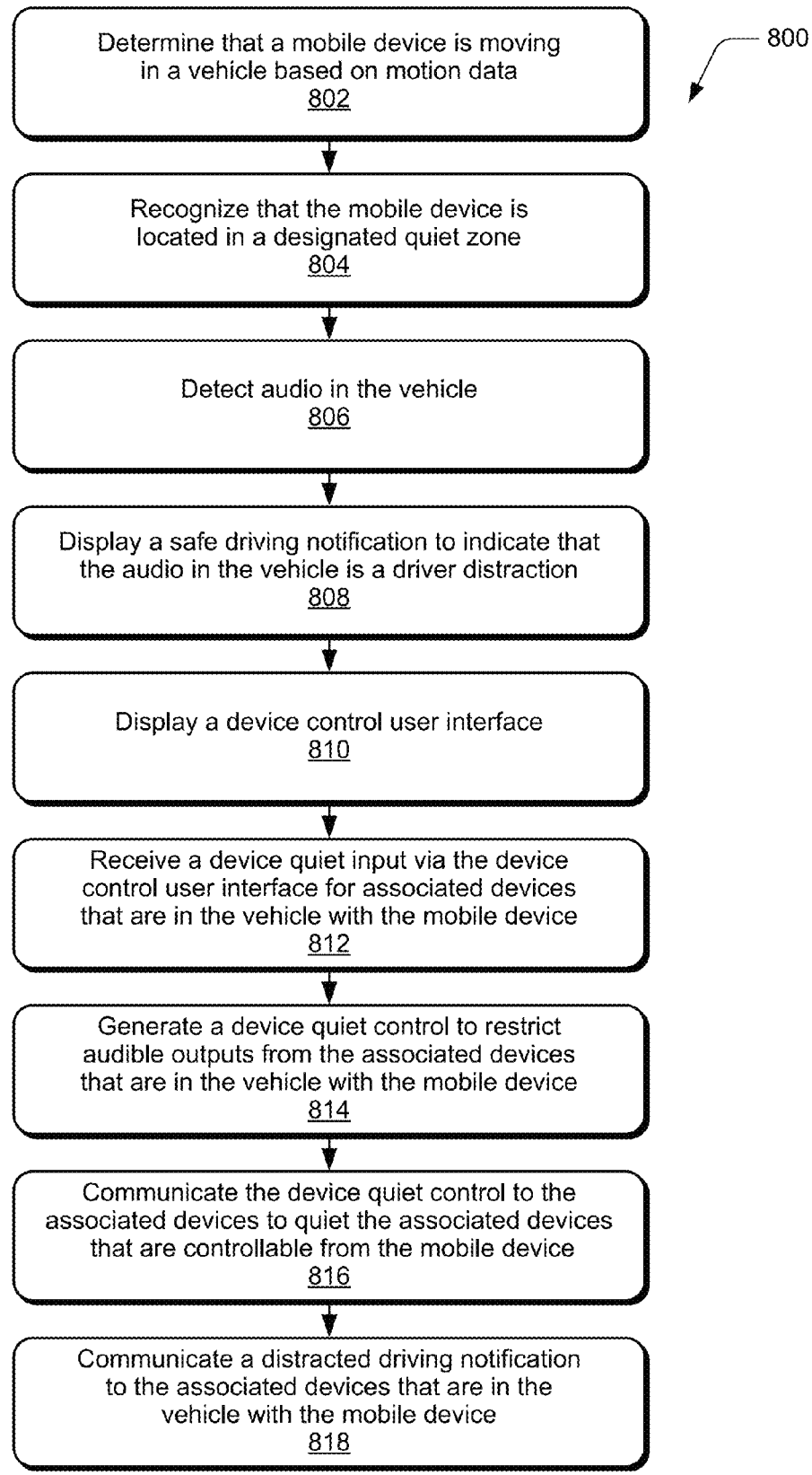
FIG. 8 illustrates an example procedure for mobile device control.

FIG. 8 illustrates example technique 800 of mobile devices control. The order in which the technique blocks are described are not intended to be construed as a limitation, and any number of the described technique blocks can be combined in any order to implement a technique, or an alternate technique.

At block 802, a determination is made that a mobile device is moving in a vehicle based on motion data. For example, the mobile device (FIG. 6) includes the device control service 114 that determines the mobile device is moving in a vehicle based on motion data. The mobile device also includes the positioning unit 606 that determines the position data 608 and the motion data 604, which indicates that the mobile device is moving.

At block 804, the mobile device is recognized as being located in a designated quiet zone. For example, a vehicle may be designated as a quiet zone 610 so that distractions from mobile devices in the vehicle are kept to a minimum, and the device control service 114 implemented at the mobile device recognizes that the device is located in a designated quiet zone.

At block 806, audio is detected in the vehicle and, at block 808, a safe driving notification is displayed to indicate that the audio in the vehicle is a driver distraction. For example, the mobile device can include an audio sensor to detect audio in the vehicle, and the device control service 114 initiates displaying a safe driving notification on the integrated display device to indicate to a user of the device that the audio in the vehicle is likely a driver distraction. Similarly, the client device 102 can include an audio sensor to detect audio in a vehicle, and implement a device control service to initiate displaying a safe driving notification.

At block 810, a device control user interface is displayed. For example, the mobile device includes the integrated display device on which a device control user interface can be displayed, and a user can control associated devices from the mobile device with device controls 602 that are initiated and communicated to the associated devices. Similarly, the various client devices 110 each include an integrated display device to display a device control user interface.

At block 812, a device quiet input is received via the device control user interface for associated devices that are in the vehicle with the mobile device. For example, the device control service 114 at the mobile device receives a device quiet input, such as via a device control user interface, to initiate a device quiet control for associated devices. The device quiet input may be received as a user input to the mobile device via the device control user interface, or as an automated input, such as when detected audio in the vehicle is determined to be a driver distraction. The associated devices can be other mobile phones and devices that correspond to family members of a private interaction hub, such as family members traveling in a vehicle together. Similarly, a device control service implemented at the client device 102 receives a device quiet input from one of the associated devices 104 that correspond to the members of a private interaction hub.

At block 814, a device quiet control is generated to restrict audible outputs from the associated devices that are in the vehicle with the mobile device. For example, the device control service 114 at the mobile device generates the device quiet control 612 to restrict the audible outputs from the associated devices that are in the vehicle with the mobile device. The audible outputs from devices may include music and/or video playback audio, telephone call rings, keyboard clicks, and any of the many possible alerts, tones, reminders, etc. that may be distracting to a driver of a vehicle. A device quiet control can be generated and communicated to mute audio outputs of an associated device, change sound settings of the associated device, and/or any other type of software audio control of an associated device. The device quiet control can also be generated for a designated time duration and/or to restrict communication functions of the associated devices that are in the vehicle with the mobile device, such as any one or combination of text messaging, instant messaging, and voice communication functions. Similarly, a device control service implemented at the client device 102 generates a device quiet control to restrict the audible outputs from the associated devices 104.

At block 816, the device quiet control is communicated to the associated devices to quiet the associated devices that are controllable from the mobile device. For example, the mobile device communicates the device quiet control 612 to the associated devices to quiet the associated devices that are controllable from the mobile device and in the vehicle with the mobile device. Similarly, the client device 102 communicates device quiet controls to the associated devices 104. The mobile and/or client devices include a communication interface for control communication with the associated devices.

At block 818, a distracted driving notification is communicated to the associated devices that are in the vehicle with the mobile device. For example, the device control service 114 at the mobile device generates a distracted driving notification that is communicated to the associated devices for display to indicate that use of an associated device is restricted in a safe driving mode.

Figure 9:
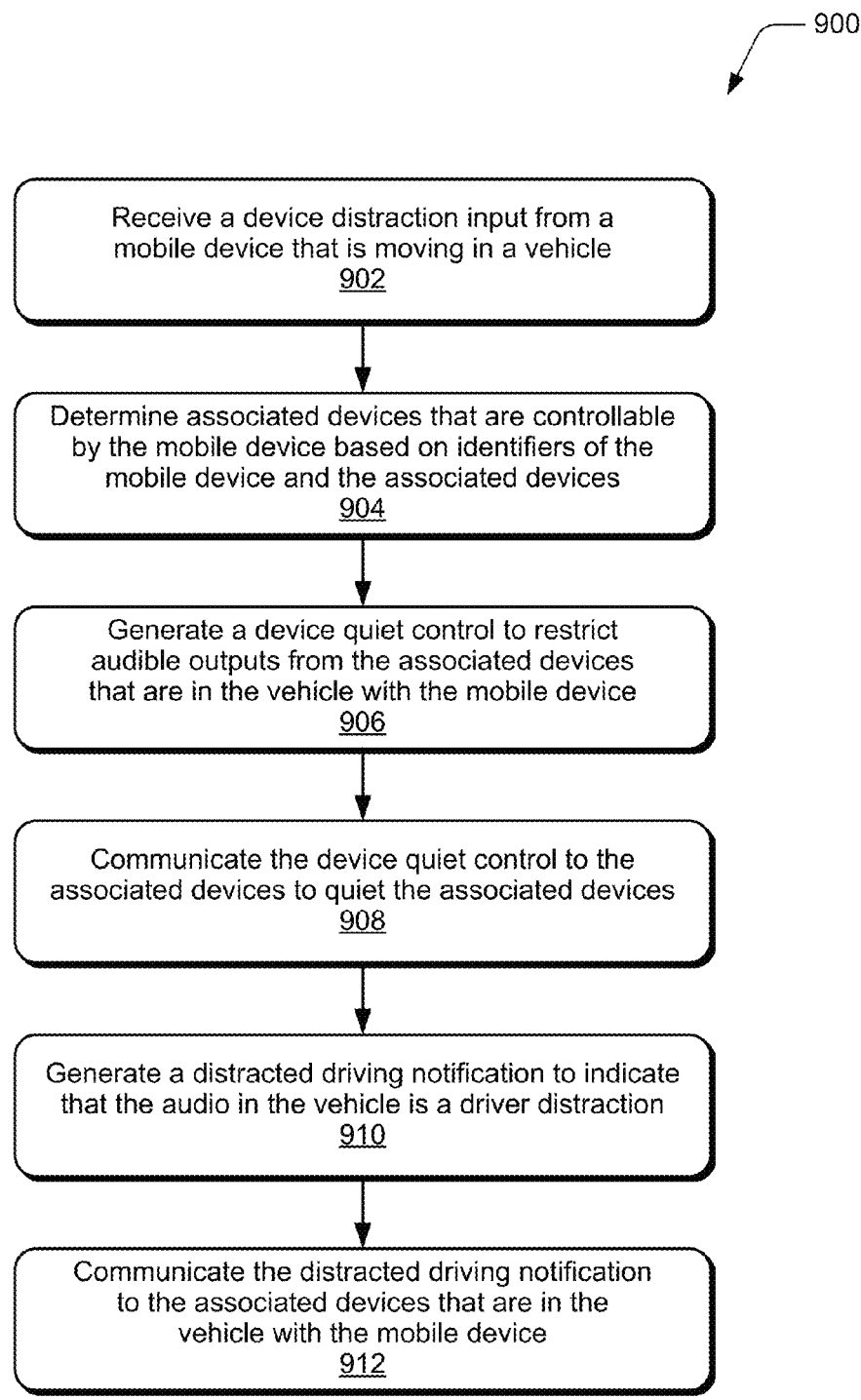
FIG. 9 illustrates example procedures for mobile device control.

FIG. 9 illustrates example technique 900 of mobile devices control. The order in which the technique blocks are described are not intended to be construed as a limitation, and any number of the described technique blocks can be combined in any order to implement a technique, or an alternate technique.

At block 902, a device distraction input is received from a mobile device that is moving in a vehicle. For example, the device control service 114 implemented as part of the platform 708 (FIG. 7) receives a device distraction input from the mobile device 702 (e.g., a controlling device) when the mobile device is moving in a vehicle. Motion data can be received from a positioning unit of the mobile device to indicate that the device is moving in the vehicle. The device distraction input can include an indication that audio in the vehicle is a driver distraction, such as detected by an audio sensor integrated with the mobile device and/or in the vehicle. The device distraction input may be a user input to the mobile device to initiate a device quiet control for associated devices (e.g., the mobile device 704). Alternatively or in addition, the device distraction input may be automated from the mobile device 702 based on a determination that the audio from the other mobile devices in the vehicle is a driver distraction.

At block 904, associated devices that are controllable by the mobile device are determined based on identifiers of the mobile device and the associated devices. For example, the device control service 114 at the platform 708 determines the associated devices, such as the mobile device 704, based on the associated devices identifiers 114. For example, the associated devices are mobile phones and devices that correspond to family members of a private interaction hub.

At block 906, a device quiet control is generated to restrict audible outputs from the associated devices that are in the vehicle with the mobile device. For example, the device control service 114 at the platform 708 generates a device quiet control to restrict the audible outputs from the associated devices that are in the vehicle with the mobile device. The device control service 114 can also generate the device quiet control for a designated time duration and/or to restrict communication functions of the associated devices that are in the vehicle with the mobile device.

At block 908, the device quiet control is communicated to the associated devices to quiet the associated devices. For example, the device control service 114 initiates communication of the device quiet control from the platform 708 to the associated devices (e.g., the mobile device 704 and other associated devices that are in the vehicle with the mobile device) to quiet the associated devices.

At block 910, a distracted driving notification is generated to indicate that the audio in the vehicle is a driver distraction and, at block 912, the distracted driving notification is communicated to the associated devices that are in the vehicle with the mobile device. For example, the device control service 114 at the platform 708 generates a distracted driving notification that is then communicated to the associated devices (e.g., the mobile device 704) in the vehicle with the mobile device 702 for display to indicate that the audio in the vehicle is a driver distraction and that use of an associated device is restricted in a safe driving mode.

Implementation Example

Figure 10:
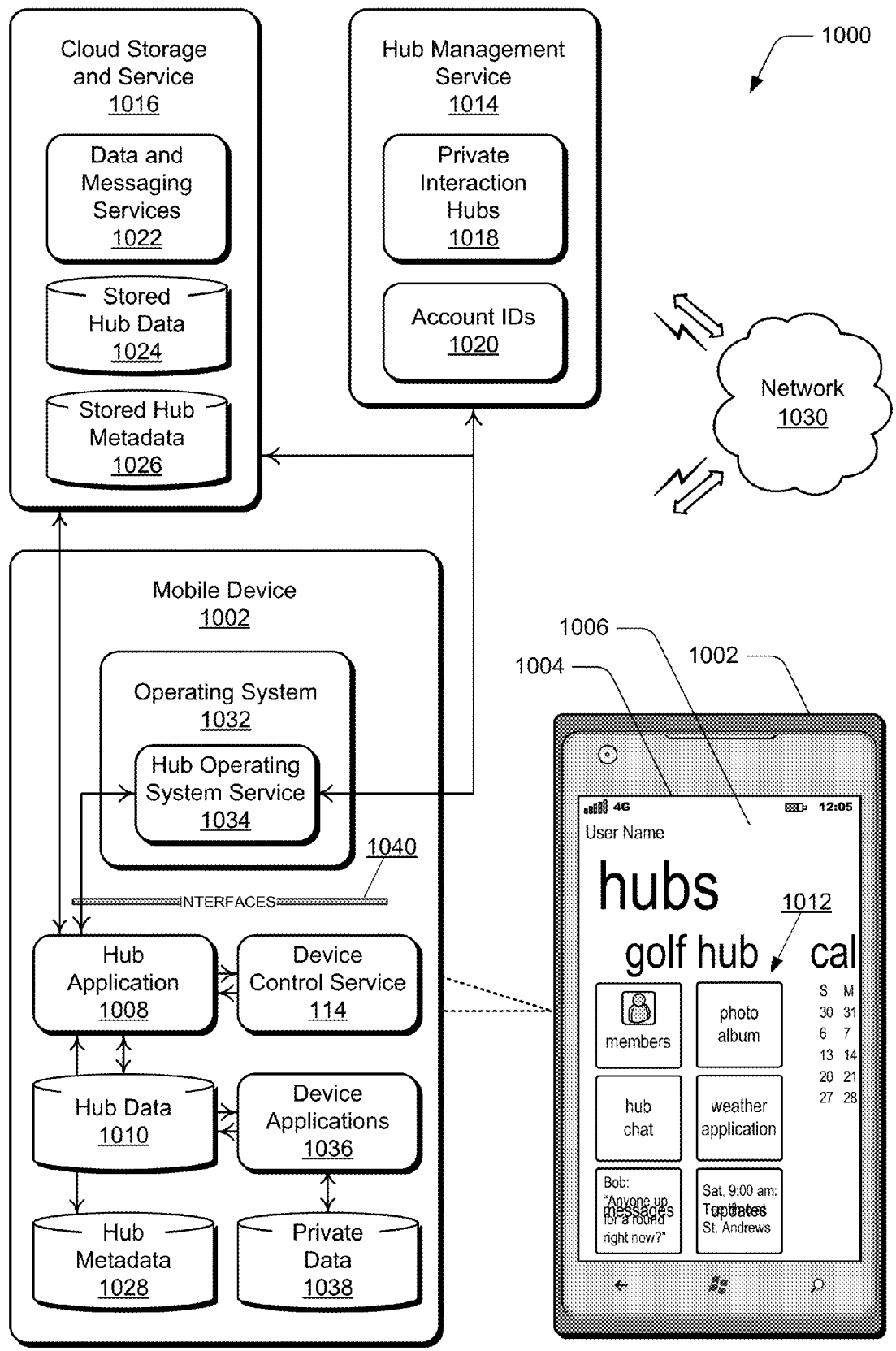
FIG. 10 illustrates an example system in which embodiments of hubs can be implemented.

FIG. 10 illustrates an example system 1000 in which embodiments of private interaction hubs can be implemented. The system 1000 includes an example mobile device 1002, which may be any one or combination of a wired or wireless device, such as a mobile phone, tablet, computing, communication, entertainment, gaming, media playback, and/or other type of device. Any of the devices can be implemented with various components, such as a processing system and memory, as well as any number and combination of differing components as further described with reference to the example device shown in FIG. 13. As such, the mobile device 1002 may implement techniques previously described in whole in or part, such as the techniques described with reference to the device control service 114.

The mobile device 1002 includes an integrated display device 1004 on which user interfaces can be displayed, such as a hub user interface 1006 of a hub application 1008. The hub user interface offers a unified interactive view of the hub data 1010 for a single, private interaction hub and the hub application 1008 aggregates disparate types of the hub data 1010 originating from the various member users of the private interaction hub. For example, the hub user interface may provide a single unified access point to shared hub messages, status updates, check-ins, hub calendar events, hub media, hub applications, and other types of hub content. As described above, a private interaction hub (or simply "hub") is a private network or association of member users who voluntarily elect to privately interact and collaborate with each other in a bi-directional manner. The hub data 1010 includes any shared data or metadata that is used to facilitate the interaction and collaboration between the members of a private interaction hub, and may include shared data for messaging, notes, contact management, documents, tasks, location updates, photos, calendar events, applications (to include collaborative gaming applications), and/or other media content, such as any type of audio, music, video, and/or image data that may be available or accessed from any source.

The basic functionality of an example private interaction hub is shown as a golf hub displayed in the hub user interface 1006 of the hub application 1008. For example, the hub user interface can include various selectable user interface tiles 1012, such as a members tile that is selectable to initiate a display of the constituent members of the private interaction hub. The user interface tiles 1012 may also include hub chat and/or messages tiles to allow a hub member to participate in shared messaging threads with the other member users of the hub. For example, as shown, the member "Bob" has asked "Anyone up for a round right now?" The user interface tiles 1012 may also include a photo album tile that is selectable to view photos shared by any of the hub members with the hub, and a shared notebook tile from which the hub members can view shared notes. For example, the golf hub may include a shared notes document that compiles the hub members' collective research of new golf equipment. The hub user interface 1006 may also display a shared calendar that allows a member of the hub to view, edit, and post calendar events that will be shared with all of the other hub members. For example, the calendar tile shows an upcoming tee time at St. Andrews on Saturday at 9:00 a.m. for all of the members. When a user selects a group item (e.g., the message from Bob) or tile (e.g., the messaging tile), further details about the selected item or group items related to the selected tile may be displayed by the hub application itself or the hub application may call a different device application 1036 (e.g., a messaging application) to display further details about the item(s).

When a user selects or otherwise engages with a piece of displayed hub data, such as the golf message from Bob, the hub application may provide additional details or options to the user to permit the user to interact further with the hub data. For example, the hub application may display controls to allow the user to edit or reply to Bob's message. Alternatively or in addition, when a user selects or otherwise engages with a piece of displayed hub data (e.g., Bob's message), the hub application may launch or call another device application to permit the user to further interact with the piece of hub data (e.g., the hub application may call a native messaging application).

The hub user interface 1006 of the hub application 1008 can also include user-selectable access to third-party applications, such as when an application is "pinned" to, or otherwise shared with a private interaction hub. A pinned third-party application may also utilize the shared hub data, such as shared application preferences or shared application state data. For example, the golf hub shown displayed in the hub user interface 1006 includes a live tile representing a third-party weather application that the members of the hub can quickly access to check the weather forecast at their local golf club, such as when planning an upcoming golf outing. A user of the mobile device 1002 can also customize display aspects of a hub user interface, such as the content of the user interface and how the elements of the hub user interface are arranged. Another example of a hub user interface of the hub application 1008 is a panoramic hub user interface, such as for a family-centric private interaction hub as shown and described in greater detail with reference to FIG. 2.

The example system 1000 also includes a hub management service 1014, and a cloud storage and service 1016. The hub management service 1014 manages the formation and maintenance of private interaction hubs 1018. The hub management service can correlate or associate member users of a hub by associating account identifiers 1020 of the members with one or more of the private interaction hubs. The account identifier 1020 of a member user may be associated with an identifier of a private interaction hub 1018 in a data table that the hub management service maintains to correlate the hub members with one or more of the private interaction hubs. The hub management service 1014 may also associate devices that correspond to hub members based on device identifiers. The account identifiers 1020 can include user membership identifiers and/or sign-on credentials, such as an email and password combination, or a username and password combination. The sign-on credentials may be single sign-on ("SSO") credentials that are utilized for authentication purposes at a number of Web services, including the cloud storage and service 1016.

The cloud storage and service 1016 can include any type of cloud-based (e.g., network-based) data and messaging services 1022. The messaging services may include any type of email, text (e.g., SMS, MMS), and/or instant messaging services. The data services may include any type of calendar, photo album, file or document sharing, location, mapping, music sharing, video sharing, gaming, contacts management, and/or notebook services, as well as any other type of services that can be used to share stored hub data 1024. The stored hub data can include any form of messages, updates, events, content, media, and information that is maintained for the private interaction hubs 1018, and is accessible from the mobile device 1002, either upon a request from a device and/or upon a data "push" to the device. The cloud storage and service 1016 also maintains stored hub metadata 1026 that includes settings and information pertaining to the private interaction hubs 1018, such as the name of a hub, the background image or photo of the hub, and an association of the hub members.

Although shown together as data and messaging services 1022, various application data services and various messaging services may be operated on separate devices and/or operated by separate, distinct entities. Additionally, although the hub management service 1014 and the cloud storage and service 1016 are shown as independent services, they may be implemented together as a single service. Further, a server device (or group of server devices) can include implementations of both the hub management service 1014 and the cloud storage and service 1016, representative of a single entity that may be the same server system, company system, domain, and the like.

The cloud storage and service 1016, and its constituent data and messaging services 1022, interchange the stored hub data 1024 and the stored hub metadata 1026 between the mobile devices that are associated with member users of a private interaction hub 1018. For example, a data and/or messaging service of the cloud storage and service 1016 can receive a copy of hub data 1010 and/or hub metadata 1028 from the mobile device 1002 that is used by a hub member, store this hub data and hub metadata in the cloud storage as the respective stored hub data 1024 and stored hub metadata 1026, and then distribute the stored hub data and stored hub metadata to other mobile devices associated with other member users of the same private interaction hub, as well as to other mobile devices associated with the same hub member. The stored hub metadata 1026 can include membership information pertaining to the member users of a private interaction hub, hub identifiers that correlate a piece of hub data to a particular private interaction hub, user identifiers that correlate a piece of hub data to a particular member user, modification dates, and/or other metadata.

The cloud storage and service 1016, and its constituent data and messaging services 1022, may utilize single sign-on ("SSO") credentials for authentication purposes to limit the dissemination of the stored hub data 1024 and the stored hub metadata 1026 to only the authorized devices of hub members. Additionally, any of the devices and services (e.g., implemented as server devices) described herein can communicate via a network 1030, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized, such as multiple devices connected using a peer-to-peer communication network.

The mobile device 1002 includes an operating system 1032 of the device, and the operating system includes a hub operating system service 1034 that is implemented to integrate cloud-based services, a hub application 1008, and local device applications 1036 with the operating system to implement aspects of the private interaction hubs 1018. The aspects that may be implemented include hub formation and membership maintenance, synchronizing the hub data 1010 on the mobile device with the stored hub data 1024, and the hub metadata 1028 with the stored hub metadata 1026, with the cloud storage and service 1016, and providing the hub application 1008 and the local device applications 1036 on the mobile device 1002 with access to the hub data 1010 and the hub metadata 1028. For example, the hub operating system service 1034 may directly access the stored hub metadata 1026 at the cloud storage and service 1016.

The hub operating system service 1034 (or alternatively, the hub application 1008) may also determine and maintain a local copy of the membership associations of member users account identifiers 1020 and identifiers of the private interaction hubs. The hub operating system service 1034 may also synchronize the stored hub data 1024 from the cloud storage and service 1016 with the hub data 1010 at the mobile device 1002, and synchronize the stored hub metadata 1026 from the cloud storage and service with the hub metadata 1028 at the mobile device. The hub operating system service 1034 may also synchronize with the cloud storage and service 1016 (e.g., by sending changes or additions to hub data 1010 and hub metadata 1028 to the cloud storage and service 1016). Such data synchronizations may occur in response to a user launching the hub application.

The mobile device 1002 includes the device applications 1036 that permit a user of the mobile device to access, create, and/or modify the hub data 1010, private data 1038 of the user, as well as the stored hub data 1024 that is managed by any of the data and messaging services 1022 at the cloud storage and service 1016. Some or all of the device applications 1036 may be implemented as client-side components or modules of any of the data and messaging services 1022, or may be implemented as standalone, native applications (e.g., local device applications) at the mobile device. The device applications 1036 typically each consume and provide access to only a portion or subset of the hub data 1010 and the private data 1038, such as only a single type of hub data and private data (e.g., only messaging data, but not calendar data). The device applications also typically present the consumed hub data to a user in conjunction with the private data 1038. Private data is data or metadata that is not associated with a private interaction hub and that has not been shared with other members of the hub (e.g., data that has not been shared via the cloud storage and service 1016).

The device applications 1036 at the mobile device 1002 may include a native or third-party messaging application that provides a user with messaging alerts and access to messaging threads. The messaging application provides access to both shared message threads shared with a private interaction hub and private message threads between a user of the mobile device and others who are not members of the hub. The messaging application also allows a user to send a message to all of the hub members without accessing a hub user interface of the hub application. The messaging application may not provide user access to other types of the hub data 1010, other than the hub messages. For example, the messaging application may not provide access to the shared calendar events or shared photo albums of the hub.

The device applications 1036 may also include a native or third-party calendaring application that provides scheduling alerts and access to a visual calendar. The calendaring application provides user access to both shared calendar events that are shared with hub members, and private calendar events (e.g., Exchange calendar events) that have not been shared with other members of the hub. The calendaring application also allows a user to create and/or share a calendar event to all members of the hub without accessing a hub user interface of the hub application. The application may not provide user access to other types of the hub data 1010, other than the hub calendar events. For example, the calendaring application may not provide access to the shared message threads or shared photo albums of the hub.

The device applications 1036 may also include a native or third-party media viewing and/or editing application that provides access to photo albums of digital photos or other digital media. The media application provides user access to both shared media files (e.g., photos, videos, and/or music) shared with a private interaction hub, and private media files that have not been shared with other members of the hub. The media application also allows a user to share media files with all members of the hub without accessing a hub user interface of the hub application. The media application may not provide user access to other types of hub data 1010, other than hub media files. For example, the media application may not provide access to the shared message threads or shared calendar events of the hub.

The hub operating system service 1034 can expose one or more Application Programming Interfaces ("APIs"), application binary interfaces, and/or other types of interfaces 1040 to the hub application 1008 and to the device applications 1036 on the mobile device 1002 to allow these applications to access, generate, and/or modify the hub data 1010 and/or the hub metadata 1028, as described herein. The hub operating system service 1034 can be implemented as an integrated software component or module of the operating system 1032. The hub operating system service can be maintained at the mobile device 1002 as executable instructions that are stored on computer-readable storage media, such as any suitable memory device or electronic data storage as described with reference to the example device shown in FIG. 13. Additionally, the hub operating system service can be executed with a processing system at the mobile device to implement aspects of private interaction hubs.

In embodiments, the hub operating system service 1034 can initiate the hub management service 1014 to provision a private interaction hub 1018. A user of the mobile device 1002 can start a private interaction hub 1018 and also invite others to join an existing private interaction hub. For example, the hub user interface 1006 of the hub application 1008 may provide an existing hub member with the option to add a new member to the hub, and the user may identify the prospective member by providing either a mobile device number, or by selecting an existing contact from one of their social networks or other contacts.

The hub operating system service 1034 can receive the request from an existing member user of the device and, in response, the hub operating system service 1034 and/or the hub management service 1014 communicates an invitation to join the hub as an SMS, MMS, or instant message sent to the prospective member's mobile device that may include a link to a registration site or other registration instructions. The hub operating system service 1034 and/or the hub management service 1014 receives (e.g., via a registration website) an acceptance to the invitation to join the private interaction hub that includes at least an account identifier (such as an SSO credential), and associates the new member with the existing hub at the hub management service 1014. Updated membership information, including the new member's account identifier 1020 may also be propagated to other mobile devices of other members in the private interaction hub from the hub management service 1014. When the new member user joins the hub, he or she may be prompted to download and/or install various applications configured to provide access to the stored hub data 1024 and the stored hub metadata 1026, such as the hub application 1008 and/or the any of the device applications 1036. The hub application 1008 may also be the entry point by which a user creates a new hub and/or modifies the membership of an existing hub.

A private interaction hub 1018 can be provisioned for any association of people, such as family members, coworkers, friends, neighbors, and any other people that may be associated together in a hub. Additionally, a member user of one private interaction hub may also be a member of multiple hubs, which can be based on a single member sign-on that identifies the member to the hub operating system service 1034 and/or to the hub management service 1014. For example, a person may be a member of a family hub that associates members of the person's family, as well as a member of a neighborhood hub that associates members of the person's neighborhood, and a golf hub that associates the person's friends that often golf together.

The integration of the hub application 1008 with the operating system 1032 of the mobile device provides that a user of the device can view a message or update on the hub user interface 1006 and in an application user interface of an application that is associated with the message or the update. For example, a hub calendar is integrated with the calendar application (e.g., a device application 1036) on the mobile device 1002, and a calendar update that is displayed in the hub user interface 1006 can be selected by the user to initiate the update being displayed in a calendar user interface of the calendar application. Alternatively, the user may view the calendar user interface and select a calendar event that is associated with a private interaction hub to initiate a display of the hub calendar, which includes the calendar event for the members of the hub. As another example, a hub calendar event can be displayed in a hub user interface, and the device calendar application can access and display the hub calendar event along with any private data calendar events that only the user of the device has access to view in a user interface of the device calendar application. The hub application 1008 and the device application 1036 both acquire the same hub calendar event data (e.g., the same hub data 1010 stored on the mobile device). The two different user interfaces (e.g., a hub user interface and a device application user interface) display the same calendar event data.

In another example, the hub messages and chat features are integrated with messaging applications (e.g., the device applications 1036) on the mobile device 1002, and an email, text, or instant message that is displayed in the hub user interface 1006 can be selected by the user of the mobile device 1002 to initiate the message being displayed in a messaging application user interface. Alternatively, the user may view a recent message from a member of a private interaction hub in a messaging application user interface, and select the message to initiate a display of the hub messages interface, such as to view the discussion thread associated with the recent message.

In embodiments, the hub operating system service 1034 at the mobile device 1002 can receive social network updates for the member users of a private interaction hub 1018, such as when two or more of the members of a hub are also "friends" on a public social network site, such as (e.g., FACEBOOK®, TWITTER®, or LINKEDIN®). The social network updates can be pulled from a social network site based on the established association of the account identifiers 1020 of the hub members of a private interaction hub 1018 at the hub management service 1014. The hub operating system service 1034 can then aggregate the social network updates for a particular hub for display in the hub user interface 1006 or on a homepage "live tile" associated with the hub. The hub operating system service 1034 at the mobile device 1002 can also be implemented to coordinate multi-user interactive updates to an event that is managed in a private interaction hub. For example, several members of a hub may participate in a multi-player interactive game, and each successive interactive update from a member of the hub is initiated by the member at a respective associated mobile device.

Figure 11:
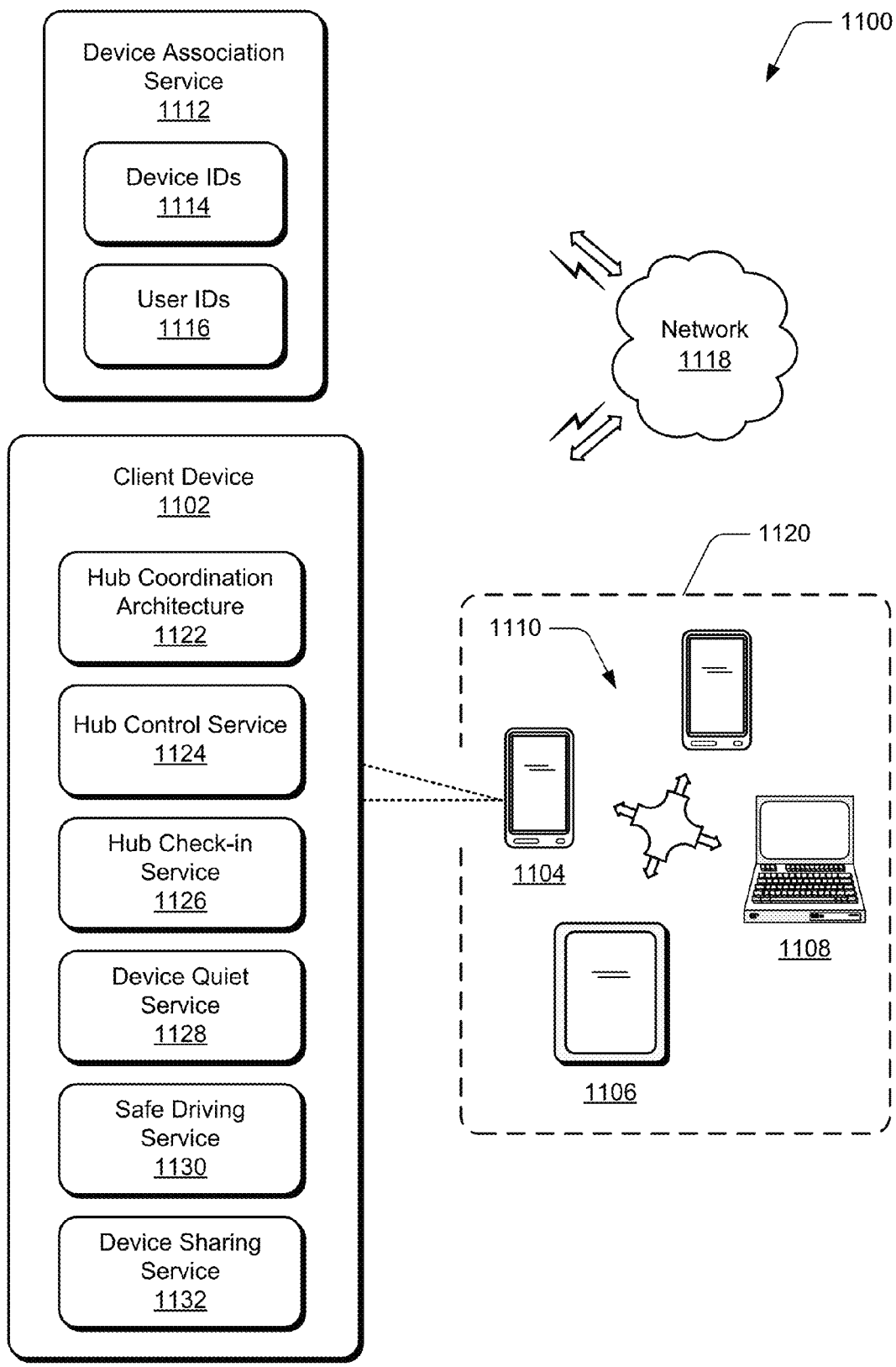
FIG. 11 illustrates another example system in which various embodiments of the previously described techniques can be implemented.

FIG. 11 illustrates an example system 1100 in which various embodiments of the previously described techniques can be implemented. The example system includes a client device 1102, which may be any one or combination of a mobile phone 1104, tablet device 1106, computing device 1108, communication, entertainment, gaming, navigation, and/or other type of portable electronic device as previously described. Any of the client devices 1110 can be implemented with various components, such as a processor and/or memory system, as well as any number and combination of differing components as further described with reference to the example device shown in FIG. 13 to implement embodiments of the techniques described herein.

The example system 1100 includes a device association service 1112 that associates or correlates the client devices 1110 by device identifiers 1114, user identifiers 1116, and/or by any other type of identifiable association. Any of the devices and services can communicate via a network 1118, which can be implemented to include wired and/or wireless networks. The network can also be implemented using any type of network topology and/or communication protocol, and can be represented or otherwise implemented as a combination of two or more networks, to include IP-based networks and/or the Internet. The network may also include mobile operator networks that are managed by mobile operators, such as a communication service provider, cell-phone provider, and/or Internet service provider. A mobile operator can facilitate mobile data and/or voice communication for any type of a wireless device or mobile phone.

The client devices 1110 can each be associated with a different user, and the users are defined members of a hub 1120. The example client device 1102 is representative of the various client devices 1110 in the hub. Any of the client devices in the family can include services, such as software applications (e.g., computer-executable instructions), that can be executed by a processor or processor system to implement the embodiments described herein. In this example, the client device 1102 includes a hub coordination architecture 1122 that implements features of a hub; a hub control service 1124 that implements features of a hub dashboard; a hub check-in service 1126; a device quiet service 1128 that implements features of quiet time and quiet zone; a safe driving service 1130; and a device sharing service 1132.

Additionally, any one or combination of the various client device services may be abstracted for implementation by a network service provider, such as the device association service 1112. For example, the client devices 1110 that are associated in the hub 1120 can be interconnected through a central computing device or system (e.g., may be one of the client devices 1110), which may be local to the multiple devices or may be located remotely from the devices. In embodiments, the central computing device may be a cloud service of one or more server computers that are connected to the multiple devices via the communication network 1118 or other communication link. The interconnection architecture enables functionality across multiple devices to provide a common and seamless experience to a user of the multiple devices. Each of the client devices may have different physical configurations and capabilities, and the central computing device implements a platform to enable delivery of an experience that is both tailored to a particular device and yet common to all of the devices.

Figure 12:
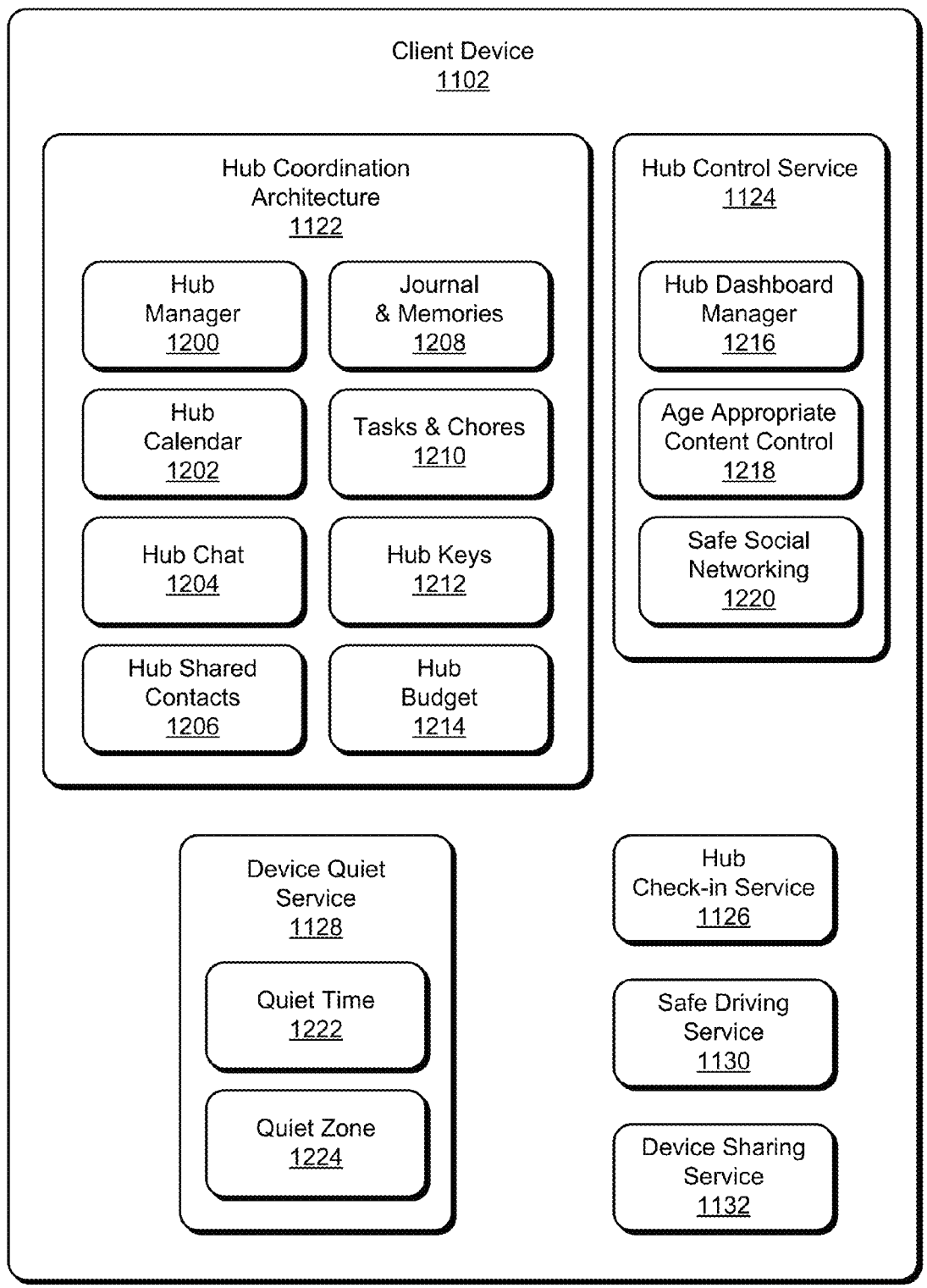
FIG. 12 further illustrates the various client device services that are described with reference to the previous sections.

FIG. 12 further illustrates the various client device services that are described with reference to the previous sections. The client device 1202 includes the hub coordination architecture 1122, the hub control service 1124, the hub check-in service 1126, the device quiet service 1128, the safe driving service 1130, and the device sharing service 1132. In embodiments, the hub coordination architecture 1122 may generally be implemented as a service, as described herein. Generally, any of the described services may be implemented and/or described in the general context of software, firmware, hardware (e.g., fixed logic circuitry), manual processing, applications, routines, programs, objects, components, data structures, procedures, modules, functions, or any combination thereof. A software implementation represents program code that performs specified tasks when executed by a computer processor. In embodiments, any of the processing, computation, filtering, code execution, etc. can be implemented with distributed computing services and/or devices, such as on a client device, a server device, and/or network-based service.

In this example of the client device services, the hub coordination architecture 1122 includes a hub manager 1200 that implements, coordinates, and/or manages various hub features, such as hub calendar 1202, hub chat 1204, hub shared contacts 1206, hub journal and memories 1208, tasks and chores 1210, hub keys 1212, and hub budget 1214. The hub control service 1124 implements features such as a hub dashboard manager 1216, age appropriate content control 1218, and safe social networking 1220. The device quiet service 1128 implements features such as quiet time 1222 and quiet zone 1224. The various client device services and features are further described throughout the document.

Any of the client device services can include, be integrated with, or implement any of the other client device services and applications. For example, the hub coordination architecture 1122 can include any one or combination of the hub control service 1124, the hub check-in service 1126, the device quiet service 1128, the safe driving service 1130, and the device sharing service 1132. In embodiments, the hub coordination architecture 1122 may be implemented for the coordination of time, messaging, data, activities, and any other shared services. The shared services may be any of the client device services and/or any type of shared services that may be associated with a service and/or multi-system operator (MSO) devices. Further, the hub control service 1124 can be implemented to throttle, expand, manage, and/or reallocate data sharing of the client device services. Any of the hub features and/or applications of the hub coordination architecture can be implemented as private, some private and some public, or private with optional user control to share information and data with public third-party services and applications. Similarly, any of the client device services and applications described herein may be private, public, sharable, user-controllable, and/or any combination thereof.

Figure 13:
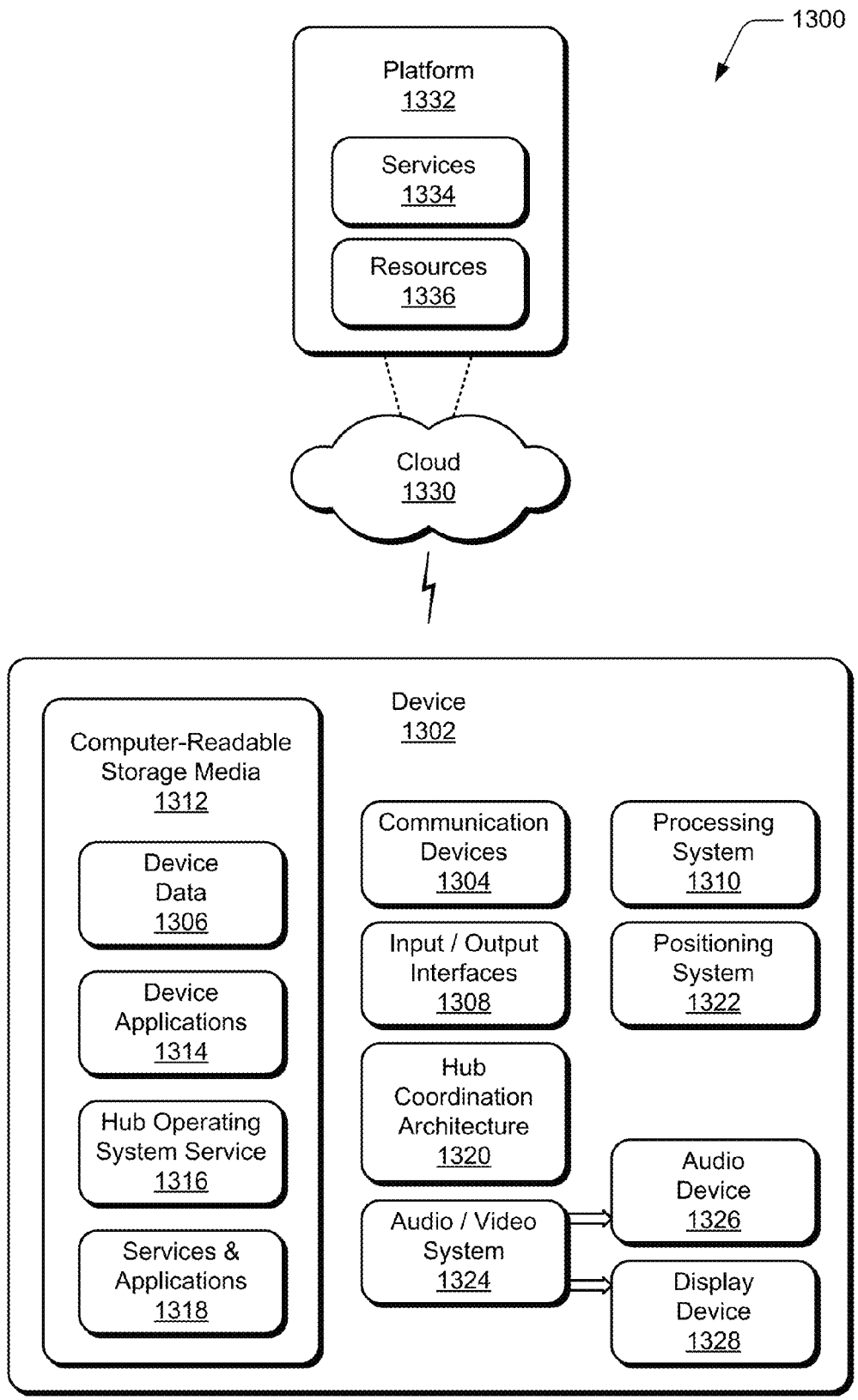
FIG. 13 illustrates an example system that includes an example device, which can implement embodiments of private interaction hubs.

FIG. 13 illustrates an example system 1300 that includes an example device 1302, which can implement embodiments of private interaction hubs. The example device 1302 can be implemented as any of the devices, services, and/or servers previously described, such as any type of client or mobile device (e.g., mobile phone, tablet, computing, communication, entertainment, gaming, media playback, and/or other type of device). For example, the mobile device 1002, device control service 114, and/or cloud service and storage 1016 shown in FIG. 10 may be implemented as the example device 1302.

The device 1302 includes communication devices 1304 that enable wired and/or wireless communication of device data 1306, such as media content and the shared messages, updates, and events data at the device. The media content can include any type of audio, video, and/or image data. The communication devices 1304 can also include transceivers for cellular phone communication and/or for network data communication.

The device 1302 also includes input/output (I/O) interfaces 1308, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The I/O interfaces 1308 also support natural user interface (NUI) inputs to the device 1302, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 1302 includes a processing system 1310 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1302 may further include any type of a system bus or other data and command transfer system that couples the various components within the device. A system bus can include any one or combination of different bus structures and architectures, as well as control and data lines.

The device 1302 also includes computer-readable storage media 1312, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 1312 provides storage of the device data 1306 and various device applications 1314, such as an operating system that is maintained as a software application with the computer-readable storage media and executed by the processing system 1310. In this example, the device applications also include an hub operating system service 1316 that implements embodiments of private interaction hubs, such as when the example device 1302 is implemented as the client device 1002 shown in FIG. 10. An example of the hub operating system service 1316 is the hub operating system service 1024 that is integrated with the operating system 1022 at the mobile device 1002, as described with reference to FIG. 10.

The device applications 1314 can also include any of the hub services and applications 1318 that implement embodiments of private interaction hubs and/or mobile devices family coordination, such as described with reference to FIGS. 10-12. The example device 1302 also includes a hub coordination architecture 1320, which may be implemented in the general context of software, firmware, hardware (e.g., fixed logic circuitry), or any combination thereof to support embodiments of private interaction hubs and/or mobile devices family coordination. The device 1302 can also include a positioning system 1322, such as a GPS transceiver, or similar positioning system components, that can be utilized to determine a global or navigational position of the device.

The device 1302 also includes an audio and/or video system 1324 that generates audio data for an audio device 1326 and/or generates display data for a display device 1328. The audio device and/or the display device include any devices that process, display, and/or otherwise render audio, video, display, and/or image data. In implementations, the audio device and/or the display device are integrated components of the example device 1302. Alternatively, the audio device and/or the display device are external, peripheral components to the example device.

In embodiments, at least part of the techniques described for private interaction hubs may be implemented in a distributed system, such as over a "cloud" 1330 in a platform 1332. The cloud 1330 includes and/or is representative of the platform 1332 for services 1334 and/or resources 1336. For example, the services 1334 may include the hub management service 1008 and the cloud service and storage 1010 as described with reference to FIG. 10. Additionally, the resources 1336 may include any of the messaging applications and the collaborative applications as described previously.

The platform 1332 abstracts underlying functionality of hardware, such as server devices (e.g., included in the services 1334) and/or software resources (e.g., included as the resources 1336), and connects the example device 1302 with other devices, servers, etc. The resources 1336 may also include applications and/or data that can be utilized while computer processing is executed on servers that are remote from the example device 1302. Additionally, the services 1334 and/or the resources 1336 may facilitate subscriber network services, such as over the Internet, a cellular network, or Wi-Fi network or a combination of these networks. The platform 1332 may also serve to abstract and scale resources to service a demand for the resources 1336 that are implemented via the platform, such as in an interconnected device embodiment with functionality distributed throughout the system 1300. For example, the functionality may be implemented in part at the example device 1302 as well as via the platform 1332 that abstracts the functionality of the cloud 1330.

Although embodiments of mobile devices control have been described in language specific to features and/or methods, the appended claims are not necessarily limited to the specific features or methods described. Rather, the specific features and methods are disclosed as example implementations of mobile devices control.

The invention claimed is:

1. A mobile device, comprising:
a communication interface configured for control communication with associated devices of the mobile device, the associated devices corresponding to different members of a private interaction hub that are controllable by the mobile device, the private interaction hub providing a single unified access point to shared hub data;
a processing system to implement computer instructions as a device control service that is configured to:
synchronize a local copy of membership association member users identifiers with hub data stored on a cloud storage and service;
determine that the mobile device is moving in a vehicle based on motion data;
using the local copy of membership association member users identifiers, determine that one or more of the associated devices that correspond to members of the private interaction hub are in the vehicle with the mobile device;
generate a device quiet control to restrict at least audible outputs from the one or more of the associated devices that correspond to members of the private interaction hub determined to be in the vehicle with the mobile device; and
initiate communication of the device quiet control to the one or more associated devices to quiet the associated devices that are controllable from the mobile device.

2. A mobile device as recited in claim 1, further comprising an integrated display device configured to display a device control user interface, and wherein a device quiet input is received via the device control user interface to initiate the device quiet control for the one or more associated devices.

3. A mobile device as recited in claim 1, further comprising a positioning unit configured to determine the motion data that indicates the mobile device is moving.

4. A mobile device as recited in claim 1, wherein the device control service is further configured to generate the device quiet control to restrict communication functions of the one or more associated devices that are in the vehicle with the mobile device.

5. A mobile device as recited in claim 1, wherein the vehicle is a designated quiet zone, and the device control service is configured to:

recognize that the mobile device is located in the designated quiet zone; and generate the device quiet control to quiet the one or more associated devices within the designated quiet zone.

6. A method, comprising:

synchronizing a local copy of membership association member users identifiers with hub data stored on a cloud storage and service;

determining that a mobile device is moving in a vehicle based on motion data;

using the local copy of membership association member users identifiers, determining that one or more associated devices that correspond to members of a private interaction hub are in the vehicle with the mobile device;

generating a device quiet control to restrict at least audible outputs from the one or more associated devices that are in the vehicle with the mobile device, the associated devices corresponding to different members of the private interaction hub that are controllable by the mobile device, the private interaction hub providing a single unified access point to shared hub data; and communicating the device quiet control to the one or more associated devices to quiet the one or more associated devices that are controllable from the mobile device.

7. A method as recited in claim 6, further comprising displaying a device control user interface; and receiving a device quiet input via the device control user interface to initiate the device quiet control for the associated devices.

8. A method as recited in claim 6, wherein the device quiet control is generated to restrict communication functions of the associated devices that are in the vehicle with the mobile device.

9. A method as recited in claim 6, wherein the vehicle is a designated quiet zone, and the method further comprising:

recognizing that the mobile device is located in the designated quiet zone, and the device quiet control is generated to quiet the associated devices within the designated quiet zone.

10. A device quiet system, comprising:

a network service device to execute computer instructions as a device control service that is configured to:

synchronize a local copy of membership association identifiers with hub data stored on a cloud storage and service;

receive a device distraction input from a mobile device that is moving in a vehicle;

determine that one or more associated devices that correspond to members of a private interaction hub are in the vehicle with the mobile device;

generate a device quiet control to restrict at least audible outputs from the one or more associated devices that are in the vehicle with the mobile device, the associated devices corresponding to different members of the private interaction hub, the private interaction hub providing a single unified access point to shared hub data;

using the local copy of membership identifiers, determine the associated devices that are controllable by the mobile device based on identifiers of the mobile device and the associated devices; and communicate the device quiet control to the associated devices to quiet the associated devices.

11. A device quiet system as recited in claim 10, wherein the device distraction input is a user input to the mobile device to initiate the device quiet control for the associated devices.

12. A device quiet system as recited in claim 10, wherein the device control service is configured to receive motion data from a positioning unit of the mobile device, the motion data indicating that the mobile device is moving in the vehicle.

13. A device quiet system as recited in claim 10, wherein the device control service is configured to generate the device quiet control to restrict communication functions of the associated devices that are in the vehicle with the mobile device.

14. A device quiet system as recited in claim 10, wherein the device quiet control is generated to quiet the associated devices for a designated time duration.

15. A device quiet system as recited in claim 10, wherein the device distraction input includes an indication that audio in the vehicle is a driver distraction, and wherein the device control service is configured to:

generate a distracted driving notification to indicate that the audio in the vehicle is a driver distraction; and communicate the distracted driving notification to the associated devices that are in the vehicle with the mobile device.

16. A device quiet system as recited in claim 15, wherein the distracted driving notification is communicated for display at the associated devices to indicate that use of an associated device is restricted in a safe driving mode.

17. One or more memory devices storing computer-readable instructions which, when executed, perform operations comprising:

synchronizing a local copy of membership association member users identifiers with hub data stored on a cloud storage and service;

determining that a mobile device is moving in a vehicle based on motion data;

using the local copy of membership association member users identifiers, determining that one or more associated devices that correspond to members of a private interaction hub are in the vehicle with the mobile device;

generating a device quiet control to restrict at least audible outputs from the one or more of the associated devices that are in the vehicle with the mobile device, the associated devices corresponding to different members of the private interaction hub, the private interaction hub providing a single unified access point to shared hub data; and initiating communication of the device quiet control to the one or more associated devices to quiet the associated devices that are controllable from the mobile device.

18. The one or more memory devices of claim 17, further comprising displaying a device control user interface, and receiving a device quiet input via the device control user interface to initiate the device quiet control for the one or more associated devices.

19. The one or more memory devices of claim 17, further comprising using a positioning unit to determine the motion data that indicates the mobile device is moving.

20. The one or more memory devices of claim 17, further comprising generating the device quiet control to restrict communication functions of the one or more associated devices that are in the vehicle with the mobile device.

* * * * *